Nov. 23, 1965 E. A. THOMPSON 3,218,760
OSCILLATOR WITH FREE PISTON
Original Filed July 12, 1961 12 Sheets-Sheet 1

INVENTOR.
EARL A. THOMPSON
BY
Ralph L. Tweedale
ATTORNEY

Nov. 23, 1965      E. A. THOMPSON      3,218,760
OSCILLATOR WITH FREE PISTON
Original Filed July 12, 1961      12 Sheets-Sheet 3

INVENTOR.
EARL A. THOMPSON
BY
Ralph L. Twedell
ATTORNEY

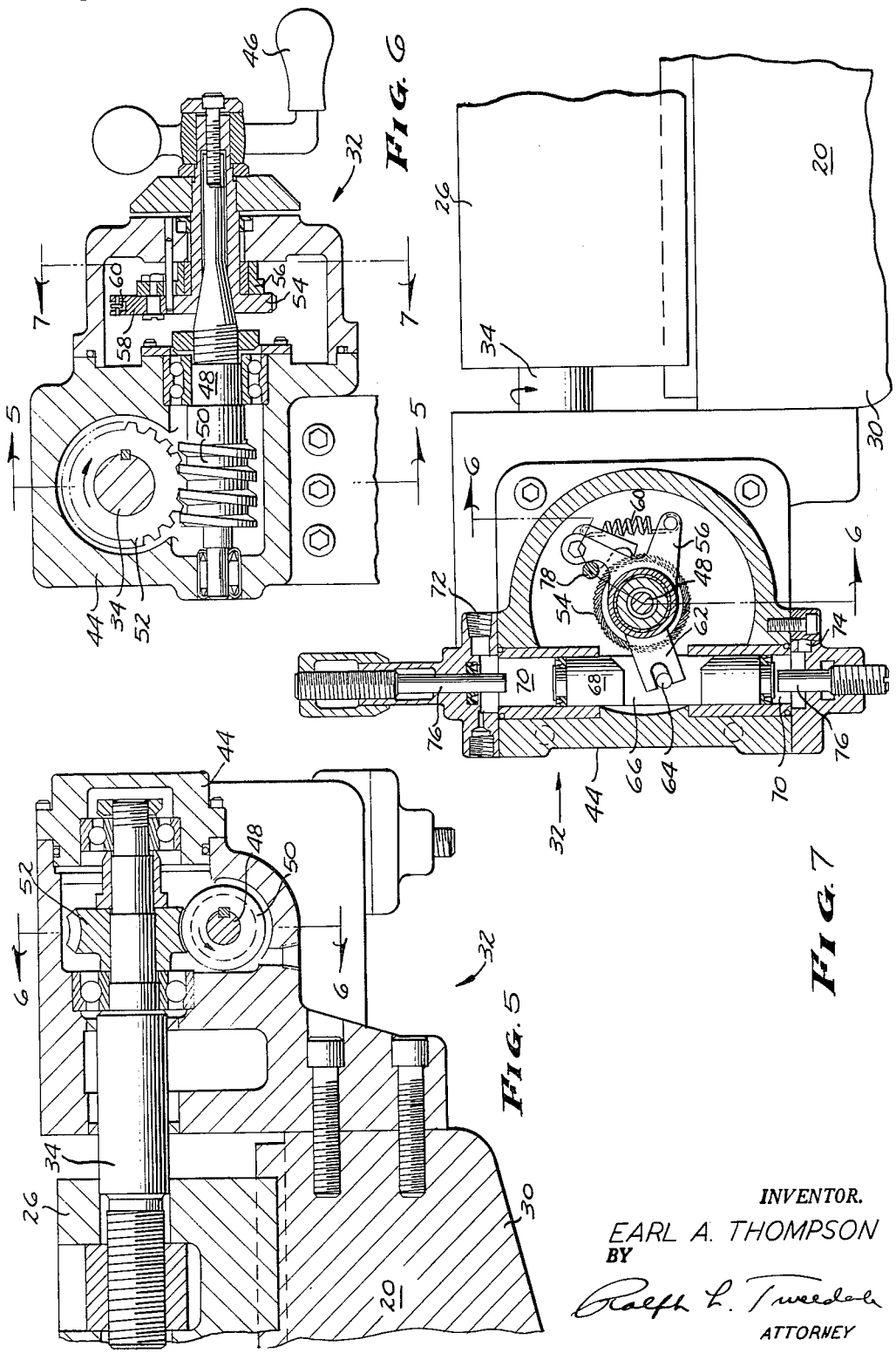

Nov. 23, 1965    E. A. THOMPSON    3,218,760
OSCILLATOR WITH FREE PISTON
Original Filed July 12, 1961    12 Sheets-Sheet 5

INVENTOR.
EARL A. THOMPSON
BY
Ralph L. Tweedale
ATTORNEY

Nov. 23, 1965    E. A. THOMPSON    3,218,760
OSCILLATOR WITH FREE PISTON
Original Filed July 12, 1961    12 Sheets-Sheet 6
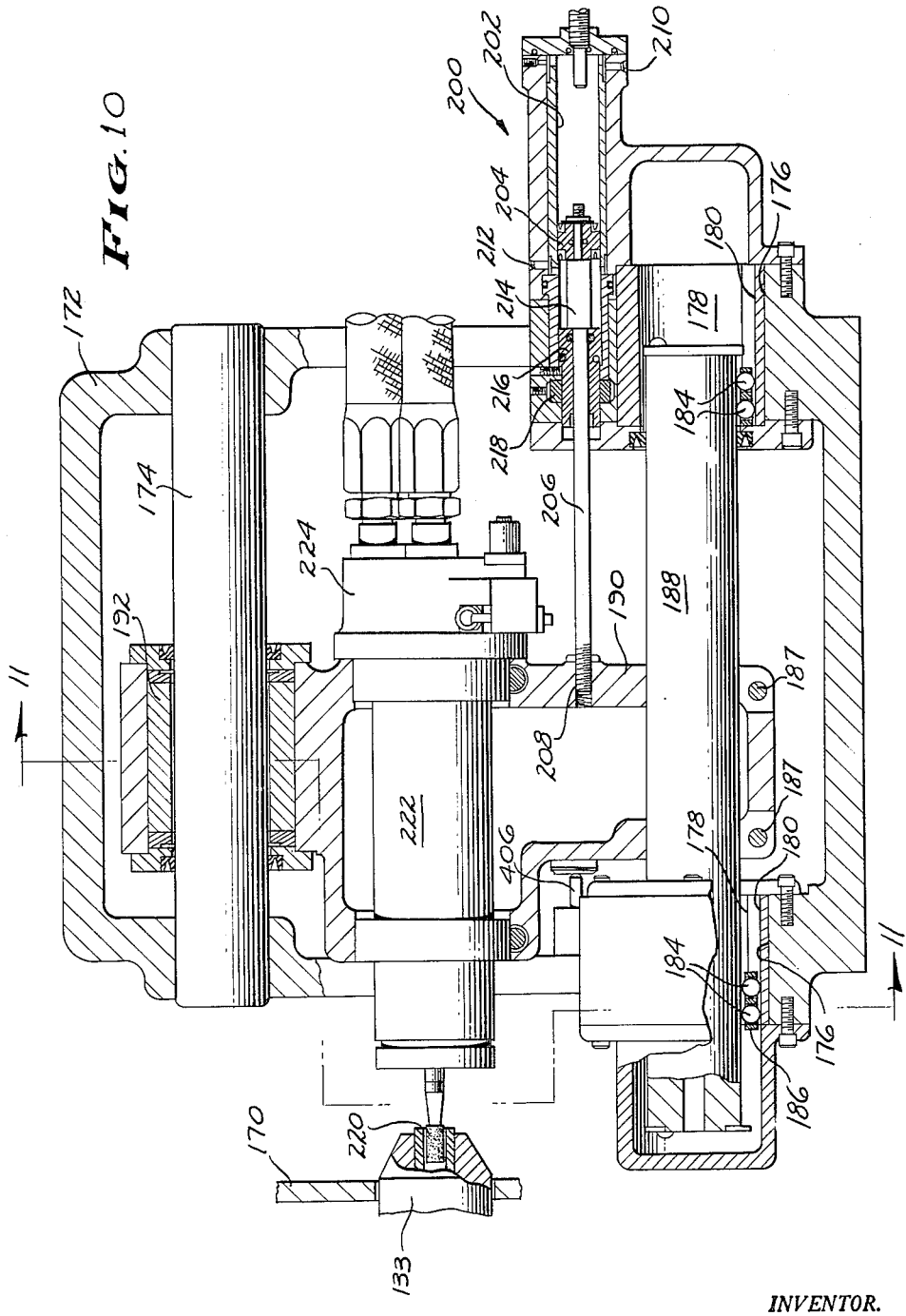
INVENTOR.
EARL A. THOMPSON
BY
*Ralph L. Twesdale*
ATTORNEY

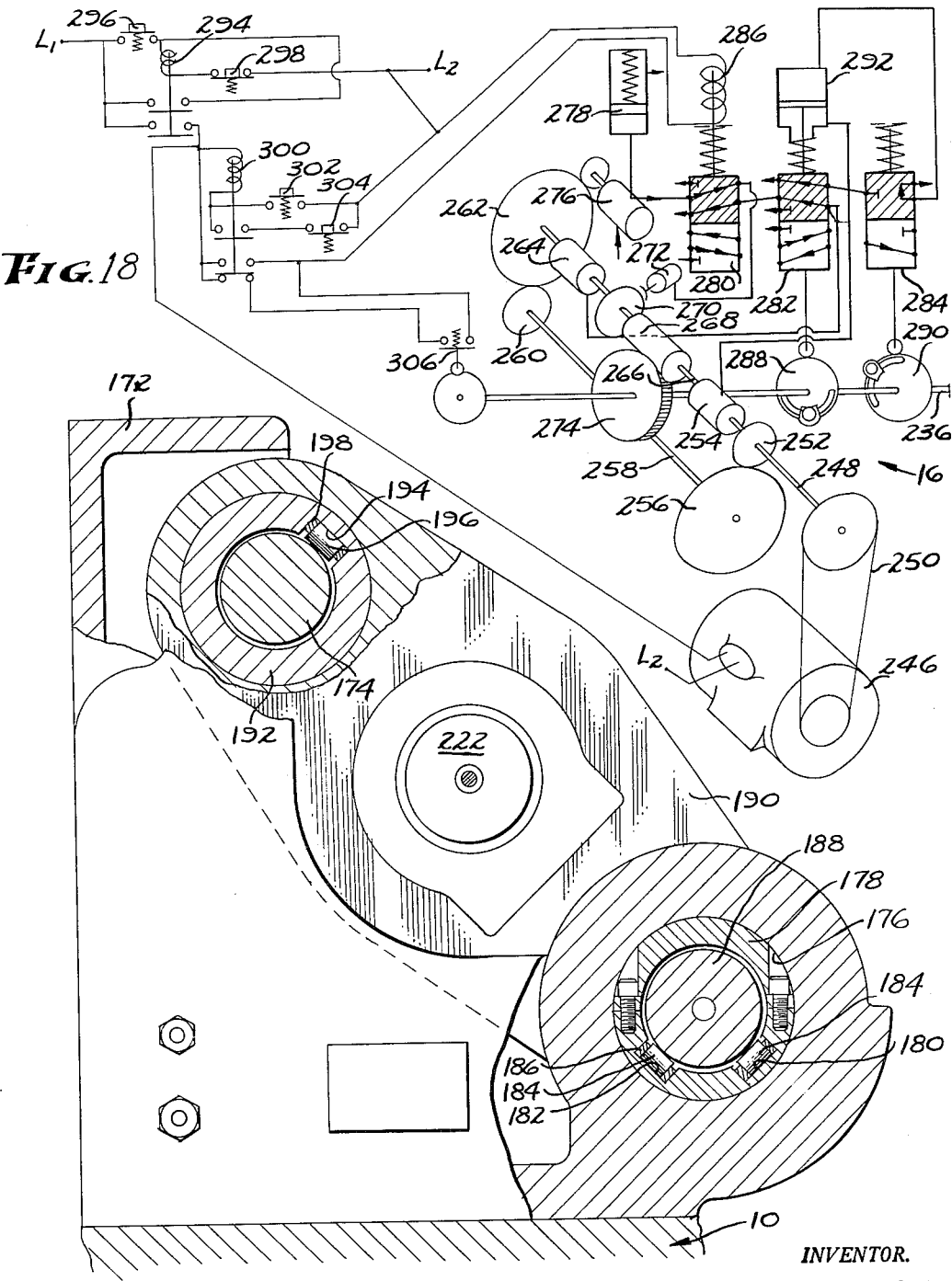

INVENTOR.
EARL A. THOMPSON
BY
*Ralph L. Tweedie*
ATTORNEY

Nov. 23, 1965  E. A. THOMPSON  3,218,760
OSCILLATOR WITH FREE PISTON
Original Filed July 12, 1961  12 Sheets-Sheet 9

INVENTOR.
EARL A. THOMPSON
BY
*Ralph L. Tweedle*
ATTORNEY

Nov. 23, 1965  E. A. THOMPSON  3,218,760
OSCILLATOR WITH FREE PISTON
Original Filed July 12, 1961  12 Sheets-Sheet 10

INVENTOR.
EARL A. THOMPSON
BY
ATTORNEY

Nov. 23, 1965   E. A. THOMPSON   3,218,760
OSCILLATOR WITH FREE PISTON
Original Filed July 12, 1961   12 Sheets-Sheet 11
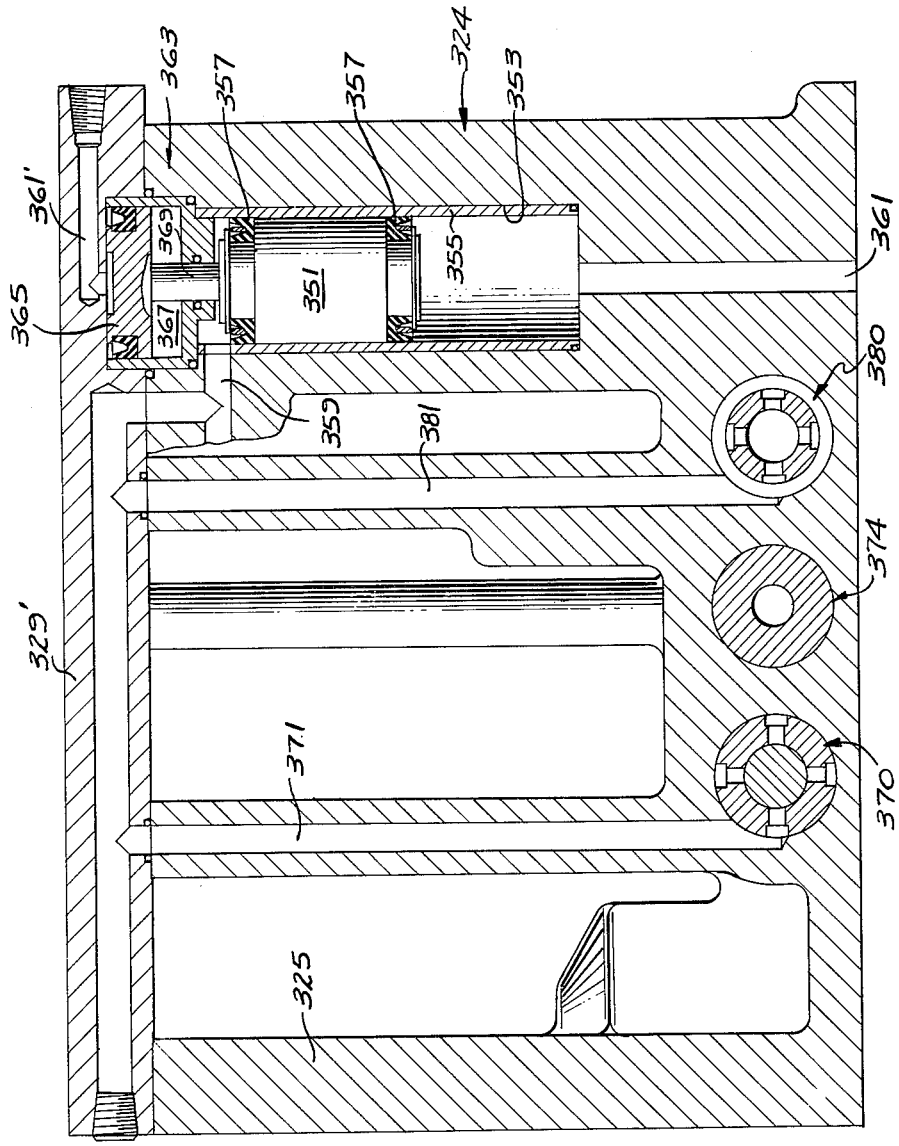
INVENTOR.
EARL A. THOMPSON
BY
ATTORNEY

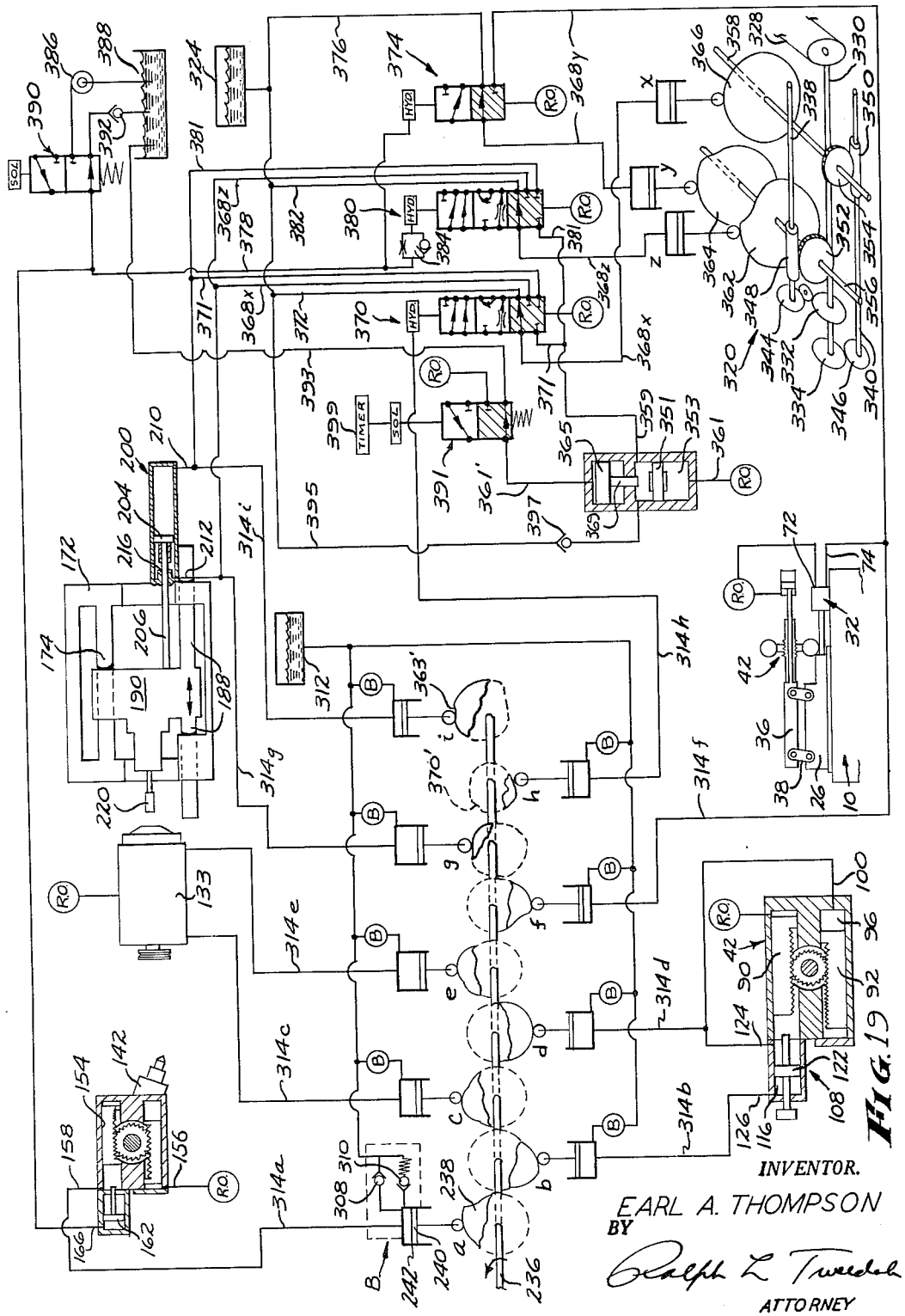

United States Patent Office 3,218,760
Patented Nov. 23, 1965

3,218,760
OSCILLATOR WITH FREE PISTON
Earl A. Thompson, Oakland County, Mich.
(1300 Hilton Road, Ferndale, Mich.)
Continuation of application Ser. No. 123,578, July 12, 1961. This application July 28, 1964, Ser. No. 386,120
28 Claims. (Cl. 51—50)

This application is a continuation of my application Ser. No. 123,578, filed July 12, 1961, now abandoned.

This invention relates to machine tools and more particularly to improved oscillator apparatus for imparting to-and-fro motion to a shiftable member on a machine tool, such as a slidable wheel carriage on a grinding machine.

The problem of obtaining a highly finished surface on a metal workpiece by means of a grinding wheel depends upon the quality of the surface of the wheel. A slightly raised particle of grit or other irregularity on the working face of the wheel, if constantly rotating in one plane, will cause an indentation scratched in the surface of the workpiece. To overcome this undesirable result, an oscillatory axial motion of the grinding wheel is often employed to prevent repetitious engagement of irregularities between the wheel and the workpiece and to erase such undesirable grooves as they are formed during the grinding operation. In addition to the to-and-fro motion during the grinding operation, it is often desirable to move the wheel to and fro during the dressing operation but with a different stroke and at a different speed. Apparatus heretofore available for these operations is ordinarily either undesirably complex and subject to frequent malfunction or is so intimately incorporated in the grinding machine that alterations are rendered prohibitive.

Especially on internal grinding machines—in relation to which the broadly usable elements of this invention are disclosed—are these problems encountered. On an internal grinder, where a small diameter grinding wheel rotating at high velocity and supported upon a relatively heavy carriage must be moved endwise through a long stroke into an aperture in a workpiece and later returned with positive control in both directions, and moved radially to grind the work when in the forward position while being oscillated through a short endwise stroke to finish the work surface, the wheel carriage must be shifted through the long stroke at a high speed, reciprocated through the short stroke at a slower speed, and reciprocated against a retruing tool through a different stroke at yet another controlled speed. The complexity of these motions, coupled with weight problems and space limitations on modern grinders, intensify the above problems.

Accordingly, it is an object of the present invention to provide improved apparatus for imparting oscillatory motion especially suitable but not limited to a relatively massive shiftable carriage member on a machine tool.

Another object of the invention is to provide improved apparatus for imparting to-and-fro vibratory motion to a shiftable carriage which may be located remote from the carriage at any convenient location on or near the machine.

A further object of the invention is to provide improved apparatus which may selectively impart one of two different oscillatory motions to a carriage and which may be used in addition to other mechanism which also shifts the carriage with positive control in both directions and with yet a different motion.

A further object is to provide, in a machine tool such as an internal grinder, improved oscillating apparatus of the mechanico-hydraulic variety including rotary cam actuated transmitters for selectively transferring motion through liquid columns to the shiftable carriage on the machine and which works against a correspondingly selectively introduced counter-biasing force.

A further and more particular object is to provide, in combination with a carriage shiftable by opposed, co-operating rotary cam powered and controlled hydraulic pulsators, a means for imparting additional shifting motion to the carriage which includes a third hydraulic pulsator operable against a constant pressure returning source wherein the returning source fluid is isolated from the working fluid of the hydraulic pulsators.

Further objects and advantages of the present invention will be apparent from the following detailed description, with reference to the accompanying drawings in which like reference characters refer to the same parts throughout the several views, and in which:

FIGURE 5 is a longitudinal sectional view along line 5—5 of FIGURE 6 showing the lead screw feed arrangement for advancing the dresser slide;

FIGURE 6 is a composite sectional view along line 6—6 of FIGURE 5 and line 6—6 of FIGURE 7 showing the worm shaft for actuating the lead screw feed arrangement;

FIGURE 7 is a sectional view along line 7—7 of FIGURE 6 showing the fluid motor actuated ratchet mechanism for controlling the worm shaft to automatically advance the dresser slide;

FIGURE 10 is a sectional view showing the three spaced point support arrangement for the wheel carriage, and the fluid motor for shifting the carriage in relation to its supporting frame;

FIGURE 11 is a sectional view along line 11—11 of FIGURE 10 showing the roller supports for the wheel carriage;

FIGURE 17 is a sectional view along lines 17—17 of FIGURE 13 showing details of the free piston assembly in the oscillator reservoir housing;

FIGURE 18 is a view in schematic fashion of the plural speed transmission with its electrical and hydraulic controls for the mechanico-hydraulic motivator used by the machine of this invention; and FIGURE 19 is a view in a schematic fashion of a mechanico-hydraulic motivator and the free piston oscillator of this invention combined for application to an internal grinding machine.

Figure 1:
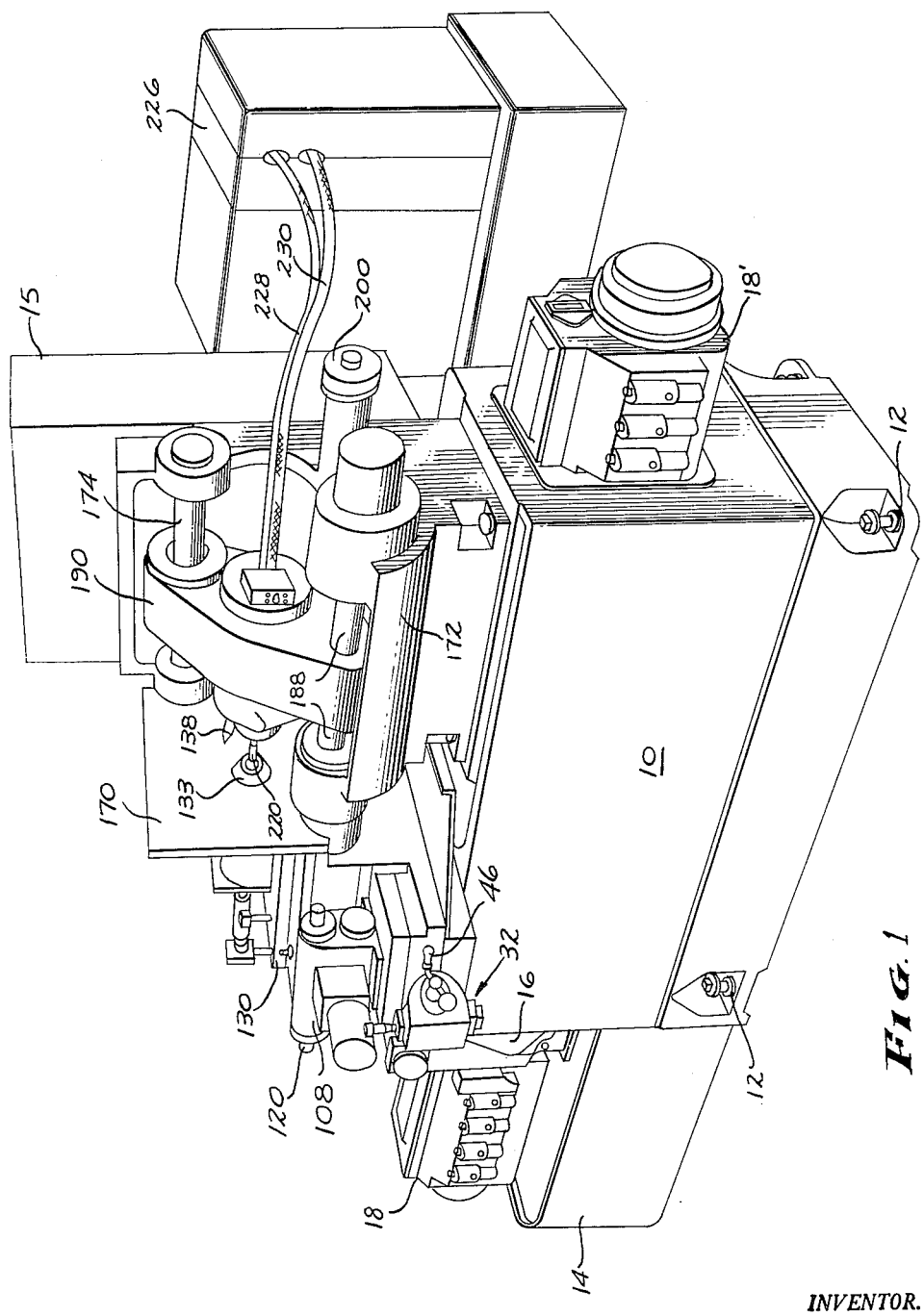
FIGURE 1 is a perspective view of an internal grinding machine embodying the features of this invention.
Figure 2:
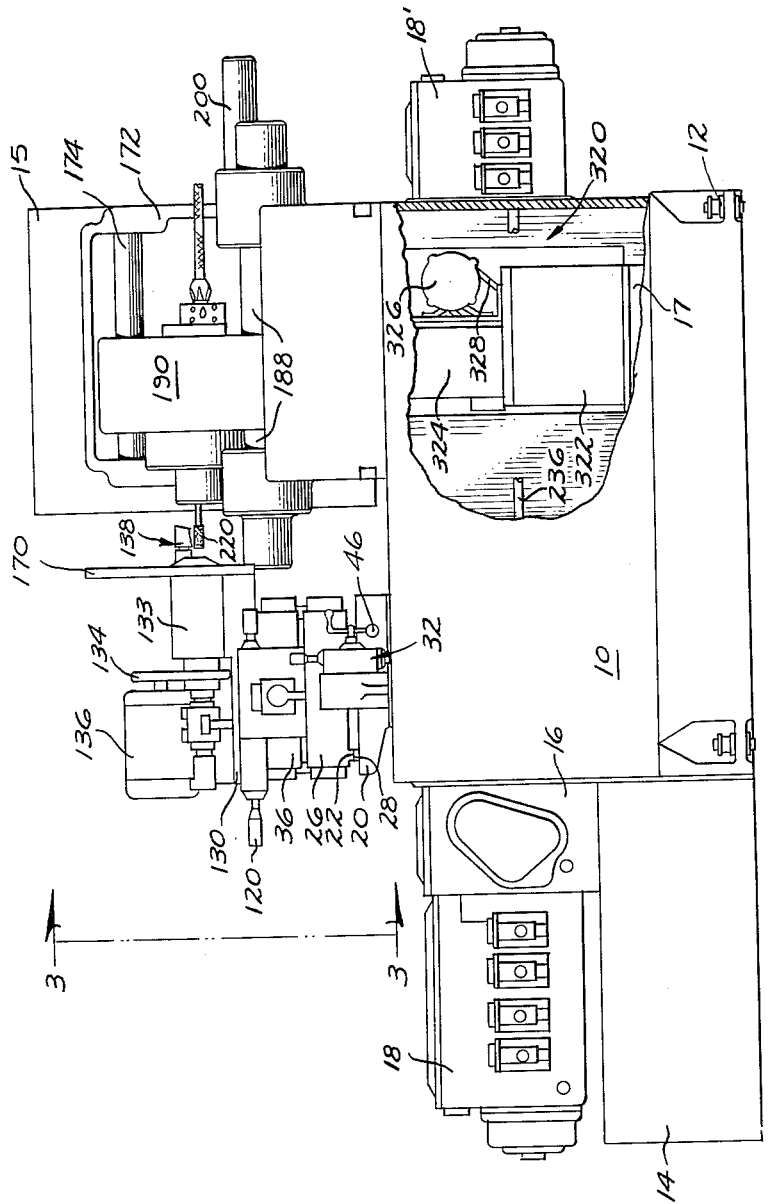
FIGURE 2 is a side elevation of the machine shown in FIGURE 1, as seen generally from the front of FIG. 1.

Looking at FIGURES 1 and 2, the internal grinding machine which embodies the features of this invention comprises a generally rectangular base 10 for movably supporting compound slide rests, to be explained, and provided with suitable leveling means 12 for supporting the entire mechanism on a floor. A mechanico-hydraulic drive unit comprising a base assembly 14 and a plural speed transmission 16 powers a main camshaft 236 (FIGS. 2, 11, 19) which may extend from either side thereof and through the length of the base 10 to drive rotary cams in at least two cam housings 18, 18' (all to be later described) supported on opposite ends of the base 10 and protruding therefrom in a conveniently accessible fashion. A housing 15 may be provided for electrical controls, and a platform 17 located interiorly of the base 10 may be provided to support the oscillator apparatus of this invention.

Figure 3:
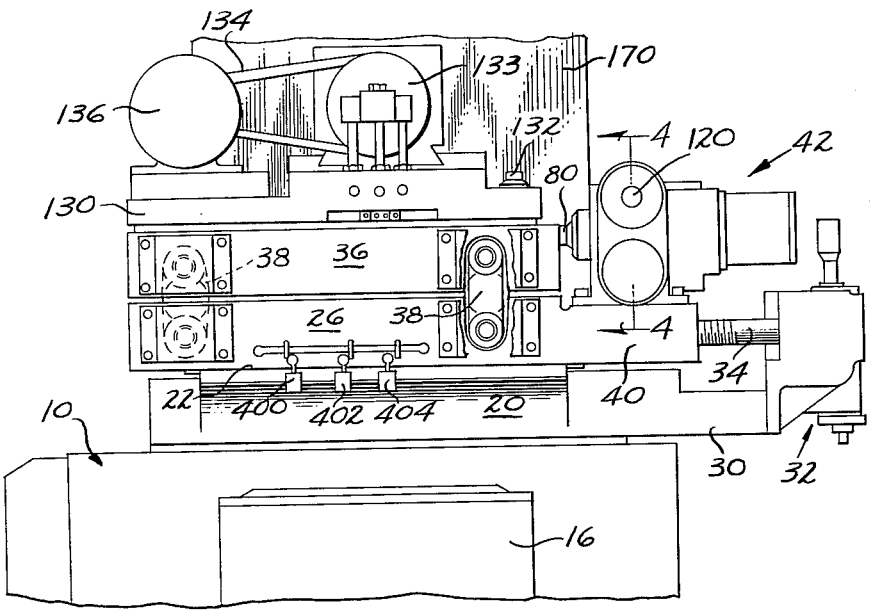
FIGURE 3 is an end view on an enlarged scale of a portion of the machine looking from line 3—3 of FIGURE 2.
Figure 4:
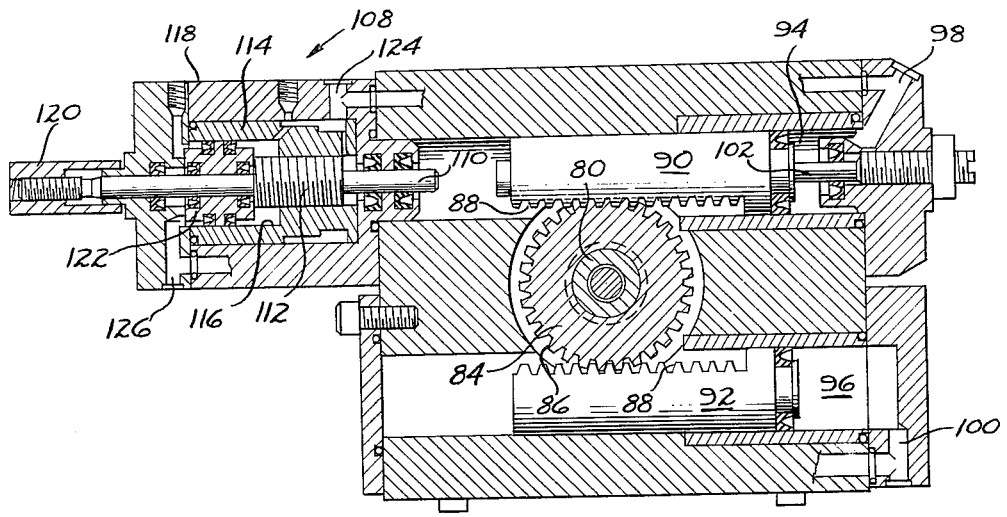
FIGURE 4 is a sectional view along line 4—4 of FIGURE 3 showing the fluid motor for actuating the lead screw feed arrangement for the parallel link supported work carrier.

As shown in FIGS. 2 and 3, at one end of the base 10, there is a bed 20 having suitable guideways 22 on the upper portion thereof, which extend horizontally at right angles to a centerline of the machine's base. This supports a slide member 26 having mating guide elements 28 for sliding motion crosswise of the machine. An extension 30 of the bed 20 (FIG. 3) supports a fluid motor actuated ratchet mechanism 32 for rotating a lead screw 34 connected to the slide member 26 to move it to and fro on the guideways 22.

A work feeding carrier 36 is supported for to and fro motion upon the slide member 26 by means of a parallel link anti-friction arrangement. Four generally vertical links 38 support the work feeding carrier 36 above the slide member 26 near its four corners; the links 38 are pivotally mounted at each end in either slide to form therewith twin parallelograms, each in a vertical plane extending crosswise of the longitudinal dimension of the machine base. The front two links and the rear two links are each interconnected by, and made unitary with, a bar (not specifically shown) having qualities of resistance to torsional forces sufficient to insure precise parallelism between each pair of links. A series of limit switches 400, 402 and 404 may be provided to detect different positional relationships between the base and the dresser carrier 26.

Supported on an extension 40 of the slide 26 is a feed mechanism 42 for imparting limited arcuate motion to the carrier 36. The feed arrangements 32 and 42 are both lead screw feeders actuated by fluid motors. The ratchet feed mechanism 32 is disclosed in detail in FIGURES 5, 6 and 7. Lead screw 34 which is threadedly connected to the slide 26 extends into the housing 44 of the ratchet mechanism which is attached to the extension 30 of the base slide 20. A crank 46 rigidly secured to a cross shaft 48 including a worm 50 engaging a worm wheel 52 keyed on lead screw 34 serves to rotate the lead screw, as can be understood from FIGURES 5 and 6.

Secured also on cross shaft 48 is a toothed rotary ratchet 54 which may also be utilized to rotate the shaft 48 and in turn automatically actuate the lead screw 34. Mounted concentrically of the shaft 48 for free rotation thereabout is an oscillating member 56 which pivotally supports a pawl 58 and a spring 60 which urges the point of the pawl into working engagement with the teeth of the rotary ratchet 54. Oscillating member 56 also has an apertured ear 62 snugly engaged by a pin 64 fastened in a cut-out area 66 of a shiftable piston 68. The piston 68 shifts to and fro within a cylinder 70 having connections 72, 74 for admitting pressurized fluid to either end thereof. Adjustable limit stops 76 at either end of the cylinder 70 serve to closely control the stroke of the piston 68. A dowel pin 78 fixed in the housing 44 serves to lift the point of the pawl 58 out of locking engagement with the rotary ratchet 54 when the piston 68 is at the extreme lower end (FIGURE 7) of the cylinder 70 against the limit stop 76 to enable the cross shaft 48 to be rotated in either direction by the hand crank 46. Pressurized fluid admitted to the lower end of the cylinder 70 through connection 74 will shift the piston 68 upwardly and oscillate the member 56 clockwise to move the pawl 58 and consequently the ratchet 54 and its associated cross shaft 48 through several degrees of angular motion. Rotation of cross shaft 48 in turn actuates lead screw 34 through a closely controlled amount of rotation to move the slide 26 in relation to the bed 20 of the machine.

The feeder mechanism 42 actuates a traveling lead screw 80 connected to the work carrier 36 in a manner which allows for limited up and down motion to compensate for the arcuate movement of the carrier 36 as it pivots on links 38 to and fro in relation to the slide member 26. Keyed against axial movement about lead screw 80 is a rotary nut 84 having gear teeth 86 around its periphery which are adapted to be engaged on opposite sides by racks 88 associated with a pair of lash free pistons 90, 92 shiftable in opposite directions in a pair of parallel cylinders 94, 96, respectively. Fluid under pressure admitted to the upper cylinder 94 through a connection 98 moves the piston 90 to the left (and lower piston 92 the same distance to the right), and oil for rotating the nut 84 in the other direction is admitted through a connection 100 to the lower cylinder 96 to move the lower piston 92 to the left (and upper piston 90 back to the right). An adjustable stop 102 limits the rightward stroke of piston 90 which in turn determines the length of the feed movement of the carrier 36.

Attached to the left end of upper cylinder 94 is a diamond wear compensator 108. The compensator comprises a limit stop or abutment 110 for the upper piston 90 of motor 42, which is adjustable by means of an enlarged thread portion 112 thereon having threads which mate with similar threads on a fixed stepped sleeve insert 114 which also contains a cylinder 116 of the same diameter as cylinder 96, and is itself contained within a housing 118 secured to the housing for the motor 42. A manually turnable handle 120 on the outer end of the adjustable limit stop shaft serves to move it in and out to determine the stroke of the piston 90 in the cylinder 94 to change the rest position of the arcuately movable carrier 36 in relation to the slide member 26.

Loosely received on the limit stop 110 is an apertured free piston 122 which slides in the cylinder 116 when the enlarged screw thread portion 112 of the limit stop is screwed inwardly toward piston 90. A connection 124 admits fluid communication with one end of the cylinder 116, and another connection 126 admits pressurized fluid to the other end thereof, both in a manner later to be described. When the limit stop 110 is fully retracted to allow a maximum stroke of piston 90, the enlarged screw thread portion 112 locks the piston 122 against sliding; however, when limit stop 110 is moved in the other direction to limit the stroke of piston 90, the piston 122 will be freely movable for an equivalent distance to vary the volume of the chamber 116.

Mounted on a swivel plate 130, which may be fixedly secured in a desired position on the carrier 36 by suitable means such as a bolt 132, is a work holder and a dressing apparatus. The work holder 133 comprises a collet or chuck which may grip or ungrip work pieces and eject finished work pieces with mechanism powered by fluid motors, not shown, enclosed within the collet housing. The collet may be rotated by a belt 134 driven from a motor 136 also mounted on a swivel plate 130.

Figure 8:
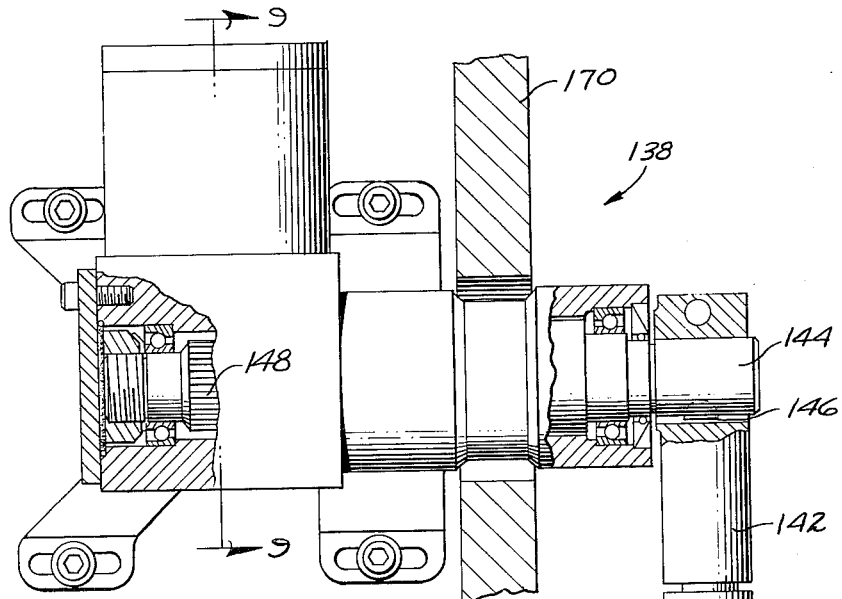
FIGURE 8 is a plan view, with parts broken away, of the dressing apparatus.
Figure 9:
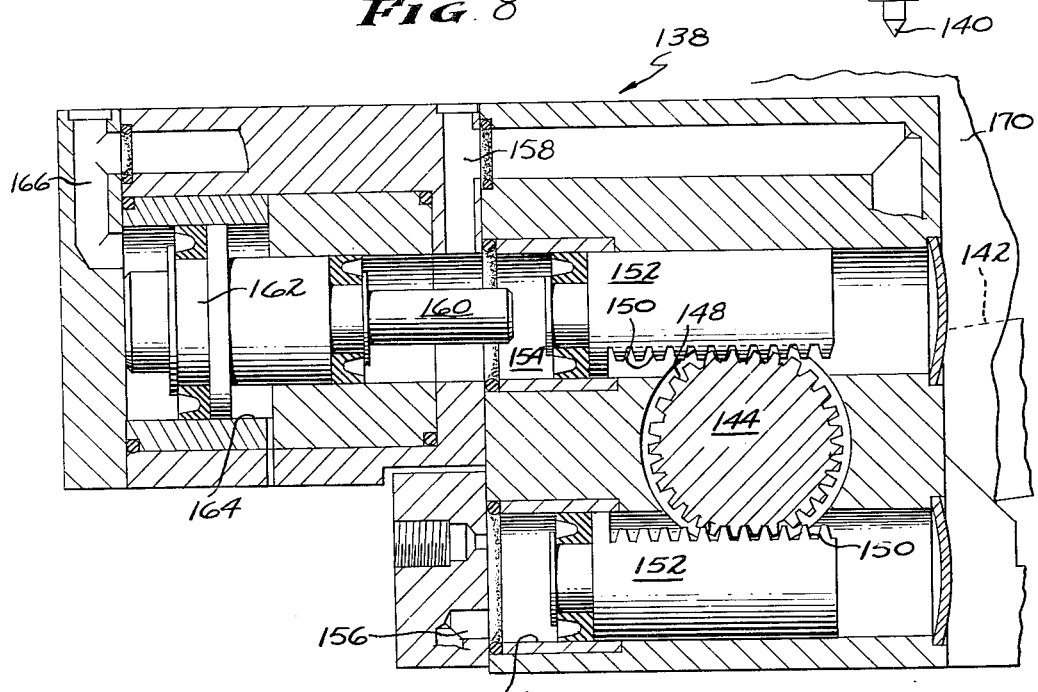
FIGURE 9 is a sectional view along line 9—9 of FIGURE 8 showing the fluid motor for moving the dressing apparatus between its operative and inoperative positions.
Figure 13:
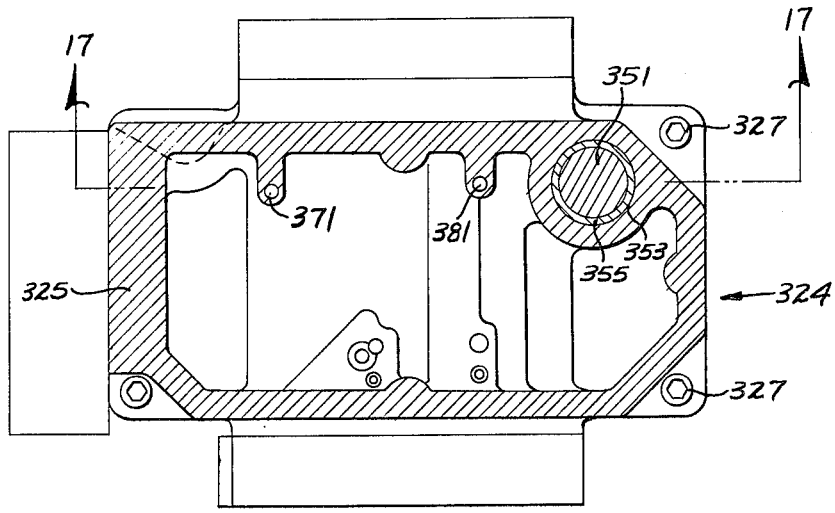
FIGURE 13 is a sectional view along line 13—13 of FIGURE 12 showing the interior of the reservoir housing.
Figure 12:
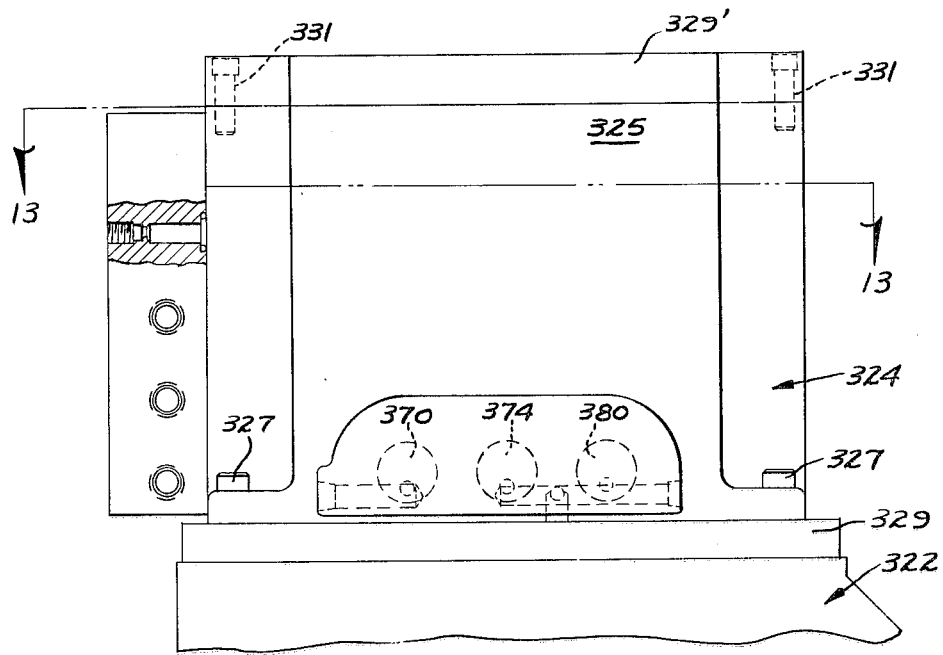
FIGURE 12 is an elevational view of the reservoir housing of the oscillator mechanism of this invention.

The dressing apparatus 138 is shown in detail in FIGURES 8 and 9 and comprises a retruing tool such as a diamond point 140 fixedly mounted on an arm 142. The arm is pivotable about the axis of a shaft 144 between two positions: one an operative position, and the other an inoperative position. The arm 142 is keyed at 146 to the shaft 144, and the shaft 144 has gear teeth 148 therearound which mesh with the teeth 150 of opposed racks made integral with alternately reciprocable pistons 152 slidably received within parallel cylinders 154. Oil pulsed through a connection 156 to the lower of the cylinders 154 moves the lower piston 152 to the right (FIGURE 9) and pivots the diamond arm 142 upwardly to the inoperative position. Fluid under pressure admitted through a connection 158 to the left hand end of the upper of the cylinders 154 moves the upper piston 152 to the right, and the lower piston back to the left, to pivot the diamond arm 142 downwardly and hold it in the operative position determined by a suitable arm-engaged limit stop (not shown) on the swivel plate 130, as can be understood.

The stroke of the upper of the pistons 152 is limited by an abutment 160 secured to a large area piston 162 reciprocable in a cylinder 164. Oil admitted through a connection 166 by means later to be described serves to shift the large piston 162 and its associated limit stop 160 to the right to hold the diamond arm down in the operative position.

Attached also to the swivel plate 130 is a tooling plate 170 upon which suitable mechanism (not shown) may be mounted for moving a new work piece from a supply source such as a loading chute to the collet holder 133, and then removing the finished work piece from the collet and depositing it in an unloading chute or other suitable discharge mechanism. It will be understood that any suitable loading and unloading mechanism may be utilized depending upon the size or configuration of the work piece to be internally ground.

Thus it will be seen that the work piece chucked in the work holder 133 has several motions in relation to the base 10. First, there is the dress compensating motion transverse to the horizontal centerline of the machine which is accomplished by the slide member 26 moved by the lead screw arrangement 34 under control of the automatic ratchet mechanism 32 or the hand crank 46. Secondly, there is an arcuate work feed motion of the work holder 133 about the lower extremities of the parallel links 38 which is also movement about a line parallel to the base centerline; this motion is extremely limited and approaches a short horizontal movement. It is accomplished automatically by fluid motor actuated lead screw 80 in conjunction with the anti-lash fluid motor arrangement 42. The chucked work piece is also rotated by means of the motor 136 during grinding operations. The wheel dressing apparatus 138 is positioned in a fixed location with respect to the chucked work in what is often referred to as a diamond sizing arrangement.

Positioned on the other end of the base 10, juxtaposed to the work carrying arrangement just described, is a framework 172 which supports a tool such as a grinding wheel for to and fro motion along a line parallel to the machine centerline. Fixedly positioned on the frame 172 is an upper guide bar 174 parallel with the longitudinal axis of the machine for guiding the movement of a grinding wheel carriage. On the lower portion of the frame 172 are two opposed bores 176 axially aligned in a direction also parallel to the longitudinal axis of the machine and occupying with the upper bar a plane which is parallel to the axis of the machine and inclined approximately half-way between the vertical and the horizontal.

Inserted within each bore 176 is a sleeve-like insert 178 with parallel roller tracks accurately machined lengthwise therein. One roller track has its bottom roller supporting face 180 lying normal to the single inclined plane in which the axes of the guide bar 174 and the two bores 176 lie. The other roller track in each sleeve insert has its roller supporting face 182 lying in a plane parallel to the plane in which the guide bar and the aligned bores lie (FIGURE 11). Freely rollable in each track of each sleeve insert are rollers 184 spaced by suitable retaining cages 186. The rolls 184 are thus arranged in the different tracks with their axes extending normally in V fashion.

Supported on the rollers 184 is a slide bar 188 free to move axially to and fro on the rolls which will in turn roll to and fro in their tracks within the bores. Slide bar 188 is surrounded, at a location intermediate its ends, by a wheel carriage 190 which is rigidly clamped thereto by suitable bolts 187.

The upper end of the carriage 190 surrounds the guide bar 174 by means of another sleeve-like or tubular insert 192 having an internal dimension somewhat larger than the diameter of the bar 174 and containing a single rollerway 194 extending lengthwise along the internal surface thereof. Rolling in the track 194 are rollers 196 in a suitable cage 198 for supporting the upper portion of the carriage 190 on the guide bar 174 and preventing gravity urged pivotal motion about the axis of the roller slide bars 188. The axes of the rollers 196 extend parallel to the plane in which the bars 174, 188 lie. Thus, as the carriage 190 is moved to and fro the upper portion of the carriage rolls on rollers 196 along the guide bar 174 fixed in the frame 172, and the lower portion of the carriage 190, which comprises the slide bar 188, rolls on the rollers 184 in the axially aligned bores 176 in the framework.

The carriage 190 is moved to and fro on the rollers by a fluid motor 200, attached to the framework 172 and comprising a cylinder 202 containing a piston 204, the rod 206 of which is rigidly attached at 208 to the wheel carriage 190. Fuid under pressure admitted through a connection 210 will move the piston 204 to the left in its cylinder 202 and consequently move the wheel carriage 190 (including its guide bar 188) to the left. Fluid admitted through connection 212 at the other end of cylinder 202 will move the wheel carriage oppositely, as can be understood. One portion of the piston rod 206, enlarged by means of sleeve 214 to form an abutment portion, limits the stroke of the piston 204 by contact with an adjustable stop member 216 in the cylinder surrounding the rod 206. Suitable means such as a rotating nut 208 turned by suitable worm mechanism from the exterior of the housing of the motor 200 may be utilized to adjust the position of the limit stop 216.

Mounted on the wheel carriage 190 is an internal grinding wheel 220 supported for high speed rotary motion by a spindle 222 rotatably driven by suitable mechanism such as a high speed turbine 224, which in turn may be powered by fluid from a remote source. Such a source may comprise a pump unit 226 driven by a suitable motor which builds up a pressure head in turbine fluid and pumps it through a line 228 to the turbine, and returns fluid through a similar line 230 to the pump. This results in a very high speed drive for the wheel which, because of the flexible hoses 228, 230, does not require that a cumbersome power unit for the grinding wheel be positioned on the carriage 190 itself.

For the purpose of giving coordinated motivation to the various fluid motors described above, there is provided a mechanico-hydraulic programming system for repeatedly producing a cycle of programmed movement, illustrated schematically in FIGURES 18 and 19. This system may be constructed as a unit having its own housing which may be positioned at any convenient location on or adjacent the base 10 and connected to the various hydraulic cylinders by suitable rigid or flexible piping. The mechanico-hydraulic drive unit comprises a master camshaft 236 carrying a plurality of cams 238, the followers of which operate transmitter pistons 240, each of which forms part of an expansible chamber liquid column type motion transfer device of which there are nine units or sections shown in the diagram of FIGURE 19. Each piston reciprocates in a cylinder 242 having a head B which contains a suitable inlet replenishing check valve 308 and a high pressure relief valve 310, both of which communicate with a low pressure oil reservoir 312 which may be formed in a housing enclosing the drive unit.

For turning the camshaft 236, a motor 246 drives an input shaft 248 of the two speed transmission 16 through a belt drive 250, as clearly seen in schematic FIGURE 18. The input shaft 248 drives a pinion 252 and also the input member of a hydraulically engaged, spring released clutch 254. Pinion 252 drives a gear 256 secured to a countershaft 258 which carries a pinion 260 at its opposite end. Pinion 260 drives a gear 262 and therewith constitutes a set of change speed gears. Gear 262 drives the input member of a second hydraulically engaged, spring released clutch 264. The driven members of clutches 254, 264 are secured to the opposite ends of a shaft 266 having a worm 268 thereon and a brake drum 270. The latter has a spring biased hydraulic motor 272 for engaging the brake. Worm 268 drives a worm wheel 274 secured to the master camshaft 236, the camshaft being visible in both of FIGURES 18 and 19.

For the purpose of automatically controlling the starting, stopping, and speed of the transmission, there is provided a hydraulic control pump 276 driven from the gear 262, which may circulate a body of oil contained in the housing surrounding the transmission. The pump 276 may deliver to a combined accumulator and relief valve comprising a spring loaded piston 278 and also supplies oil to a bank of control valves 280, 282 and 284. In the FIGURE 18 diagram, each valve is shown as a two-position valve, spring biased to the position illustrated in which the connections shown in the cross-hatched rectangles are established. Single headed arrows are used to indicate flow at reservoir pressures and double headed arrows to indicate flow at pump delivery pressure. Each of the valves, when shifted, establishes the connections shown in the unhatched rectangles immediately below the hatched rectangles.

Valve 280 is arranged to be shifted by a solenoid 286. Valves 282, 284 are arranged to be shifted by the adjustable cams 288, 290 respectively, which are positioned on camshaft 236. In addition, the valve 282 has a hydraulic holding cylinder 292, which holds the valve 282 in its shifted position until it is released by the shifting of valve 284. Valve 280 in the position shown delivers pressure fluid to engage the brake 272 and also exhausts fluid to release the low speed clutch 264. When shifted, valve 280 exhausts fluid to release brake 272 and supplies pressure fluid to engage the low speed clutch 264, subject, however, to a conjoint control by the valve 282.

The latter valve, in the position illustrated, exhausts fluid to release the high speed clutch 254, and places the low speed clutch 264 under the control of valve 280. In its shifted position, valve 282, provided valve 280 has been shifted, delivers pressure fluid to engage high speed clutch 254 and exhausts fluid to release low speed clutch 264. As previously explained, the valve 284 is merely a reset valve for by-passing the holding cylinder 292 to permit valve 282 to return to its spring-biased position shown in the drawings.

Thus, energization of solenoid 286 will start the camshaft 236 rotating at slow speed, and later the cam 288 will shift the transmission to drive the camshaft at high speed, and still later the cam 290 will again shift the transmission to slow speed. So long as the solenoid 286 remains energized, the camshaft 236 will continue to rotate, first at a slow speed and then at a high speed during each revolution controlling its own speed changes by operation of the cams 288 and 290.

For the purpose of controlling the drive motor 246 and solenoid 286, there is provided an electric control circuit connected between a pair of electric supply lines designated L1 and L2. The circuit may include a master relay 294 of the holding type having a manual master start switch 296 and a manual master stop switch 298. Relay 294 controls the motor 246 and also a cycle control relay 300 of the holding type having a manual cycle start switch 302 and a manual cycle stop switch 304. The normally opened contacts of relay 300, which are of the make-before-break type, control energization of cycle solenoid 286 directly. The normally closed contacts of relay 300 also control solenoid 286, but are in series with a cam switch 306 on the camshaft 236 and arranged to be opened once during each revolution thereof. The arrangement is such that when the cycle stop switch 304 is operated at any point in the rotation of camshaft 236, relay 300 will be de-energized, but solenoid 286 will remain energized until cam switch 306 opens at the predetermined stopping point. Operation of the master stop switch 298, however, will de-energize solenoid 286 immediately, regardless of the point in the cycle and will also de-energize motor 246.

The camshaft 236, as previously mentioned in connection with FIGURE 19, drives a number of cam operated hydraulic pulsator sections designated a thorugh i inclusive, and shown diagrammatically on the left portion of FIGURE 19. Each section may comprise units duplicating the single acting pulsating cylinder 242, the head B of which contains the replenishing check valve 308 and the spring closed relief valve 310. All the replenishing and relief valves are connected to a common oil reservoir 312 formed for instance in the housings 18, 18' of each unit. The reservoir 312 is preferably subjected to a low, yet super-atmospheric, pressure by a body of compressed air or other pressure maintaining arrangement. Check valve 308 allows flow from the reservoir 312 to the cylinder 242, while relief valve 310 allows flow oppositely when the cylinder pressure exceeds a certain value. Thus, each of the pairs of valves 308 and 310 may be referred to as a balancing valve and serve to balance the volume of fluid in each of the liquid column sections, as will be later described.

The pulsator section a is connected by a closed liquid column line 314a with the upper cylinder 154 of the fluid motor which moves the diamond dressing arm 142 between the operative and inoperative positions. The pulsator section b connects by a closed liquid column line 314b with the diamond compensator unit 108 through connection 126 to impart motion to the compensator piston 122 when it is free to move. Pulsator section d connects by means of a liquid column 314d with the connection 100 of the cylinder 96 of the fluid motor 42 which imparts limited arcuate motion to the parallel link supported carrier 36; line 314d also extends to connection 124 of the compensator apparatus 108 for conveying surplus hydraulic fluid from the compensator cylinder 116. Pulsator section f is connected by a closed liquid column 314f with the ratchet feed mechanism 32 for imparting motion to the slide member 26. Pulsator section g is connected by a liquid column 314g with the connection 212 at one end of the motor 200 for moving the wheel carriage away from the work holder 133 on the frame 172; pulsator section i is connected by a liquid column 314i with the connection 210 at the other end of the motor 200 in opposition to the section g to move the wheel carriage 190 toward the work holder 133. Pulsator section c may connect by means of a flexible line 314c with the work piece holder 133 for actuating the work piece gripping collet; similarly, pulsator section e may be connected by a line 314e with the holder 133 for ejecting a finished work piece upon completion of the grinding operation. Pulsator section h connects by means of a liquid column 314h with a hydraulic valve 370 for actuating the same for a purpose later to be described. Other pulsator sections, not shown, on either end of the shaft 236, may be utilized for operating various tooling mounted on the upright plate 170 for loading work pieces to and unloading them from the holder.

In order to insure proper synchronization of the driving and driven elements of each pulsator section, it is desireable to provide slightly more fluid displacement in the driving or transmitting elements 240, 242, than is present in their respective fluid motors at the opposite end of the liquid column line. Thus, at the end of each advancing stroke of the transmitter piston 240, a small amount of fluid will be discharged to reservoir 312 through the relief valve 310. This amount plus any amount lost through leakage will be returned to the liquid column at the end of the return stroke by the operation of the replenishing valve 308. The amount blown over the relief valve at section $b$ will depend upon the amount of movement allowed piston 122.

In FIGURE 19 there are shown several circles marked RO connected to the end of the hydraulically operated valves and some of the motive cylinders opposite the liquid column connections. These symbols designate the return oil connections by means of which a pulsator system may be hydraulically biased so as to maintain the follower in close contact with the cam as the falling portion of the cam contour recedes from the follower. This bias is maintained by a high pressure accumulator or oil reservoir, not shown, which may be provided with a manifold whereby all of the RO connections are joined together and to the high pressure reservoir. The showing of separate return oil connections in FIGURE 19 is indicative of any suitable type of biasing pressure source comprising a single common accumulator. The contours of all the individual cams 238 are likewise not illustrated in specific detail since they may be formed in accordance with the usual practice to cause motivation of each of the respective hydraulic motors and the valve 370 in accordance with the particular operating cycle desired for the machine.

It will be noted that there is no RO connection with the fluid motor 200 for shifting the wheel carriage 190, the motor 200 being actuated by the opposed hydraulic pulsators $g$ and $i$ of the program motivator. The two cams at these two stations are designed with generally complementary contours whereby the cam at section $g$ moves the piston 204 away from the forward stop 216 and the cam at section $i$ moves the piston back toward the stop 216. The cam that is not thus shifting the carriage presents a falling face to its follower to allow retraction of the liquid column from the moving piston 204. By means of this double cam arrangement, a relatively heavy wheel carriage may readily be shifted with positive control in both directions because the powering pulsator must overcome only the inertia of the carriage plus the relatively low pressure of the refill reservoir 312, and need not also overcome the relatively high pressure of the counter-biasing fluid from the source RO. Furthermore, the piston 204 may be held against a limit stop at either end of its stroke, by means of a slight cam rise which will divert liquid to the reservoir 312, with a force determined by the setting of the spring force for the relief valve 310 associated with the holding cam.

The oscillator unit 320 of this invention (FIG. 2), as previously mentioned, may be mounted on an appropriate ledge 17 within the base 10 of the machine, or at any other location adjacent or remote from the machine, as desired. The unit consists of a generally rectangular cast housing 322 which may support on its top an enclosed reservoir 324 for a supply of hydraulic fluid maintained at low, super-atmospheric pressure, and a drive motor 326. A belt drive 328 including suitable pulleys may transfer rotary motion from the drive motor 326 to an input drive shaft 330 (FIG. 16) extending through and journalled in the housing 322 of the oscillator unit.

Figure 15:
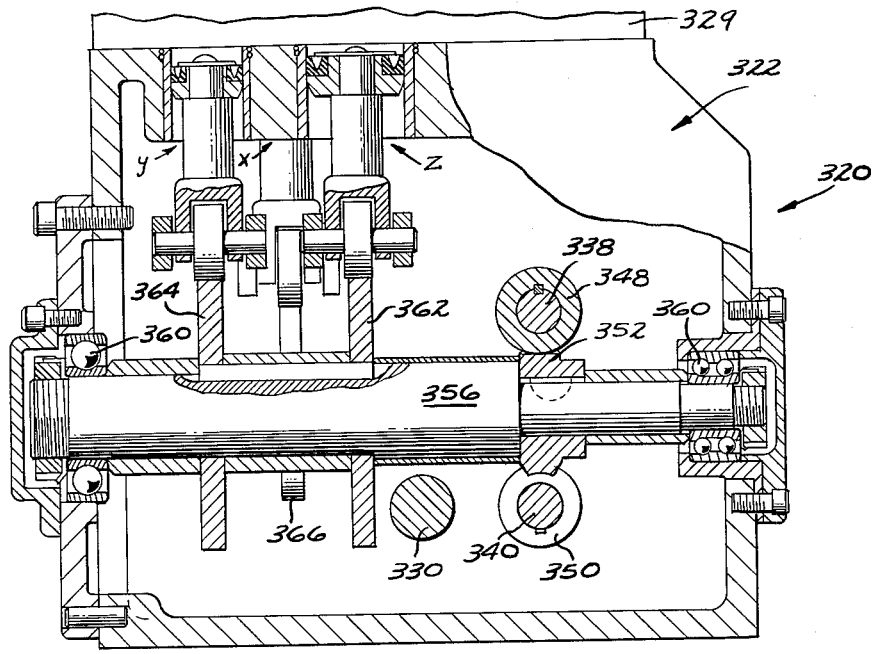
FIGURE 15 is a sectional view along line 15—15 of FIGURE 16 showing the camshaft and cams and other aspects of the interior of the oscillator apparatus.
Figure 14:
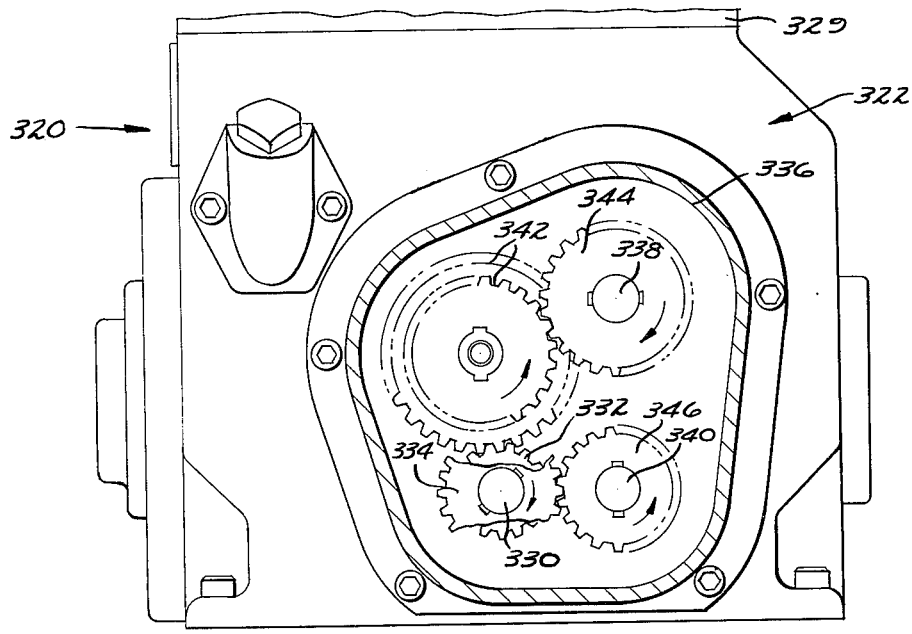
FIGURE 14 is a sectional view along line 14—14 of FIGURE 16 showing the gearing arrangement for driving the two worm shafts of the oscillator apparatus from the single input drive shaft.
Figure 16:
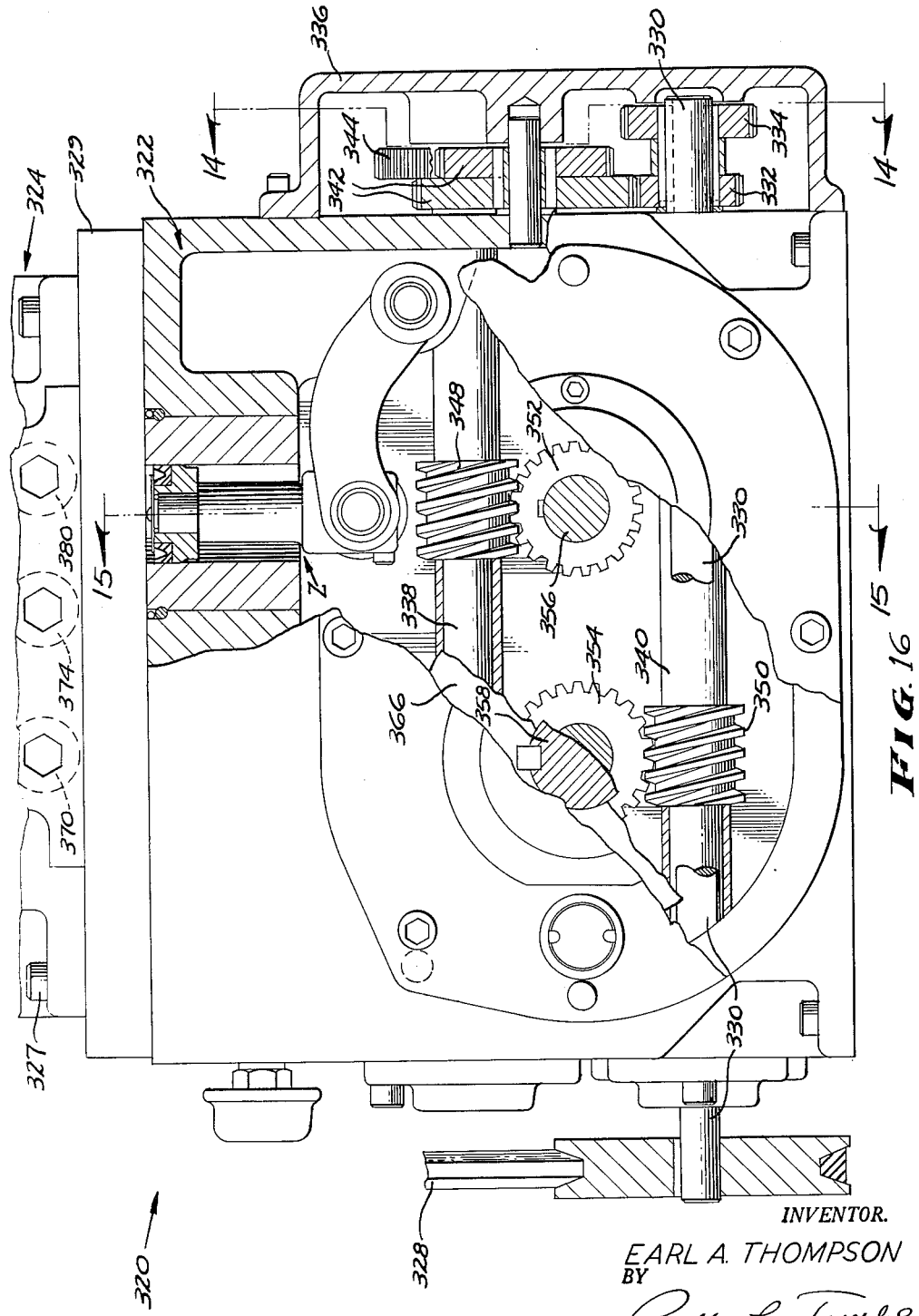
FIGURE 16 is a partial elevational view with parts broken away of the oscillator mechanism of this invention.

Within the housing of the oscillator unit, as best seen in FIGURES 14, 15 and 16, the drive shaft 330 serves to impart rotary motion at different speeds to two separate camshafts. A pair of drive pinions 332 and 334, keyed on one end of the input shaft 330 outside the confines of the housing 322 and within a cover plate 336, rotate a pair of countershafts 338 and 340. The shaft 338 is driven from the pinion 332 through a spacing and direction reversing idler pair 342 and a pinion 344 keyed on the shaft 338 and meshing with the idler. The shaft 340 is driven from the drive pinion 334 directly through a pinion 346 keyed on the end of the shaft.

The parallel countershafts 338, 340 have worms 348, 350 keyed thereon in a position to mesh with worm gears 352, 354 secured to the parallel camshafts 356, 358, respectively, which extend parallel to one another in a horizontal plane and lie in vertical planes normal to the countershafts. The shafts 356 and 358 are journalled at 360 (FIG. 15) near their ends in the housing 322 of the oscillator unit. As shown in FIG. 15 and 19 the wheel dressing camshaft 356 has a pair of rotary cams 362 and 364 keyed thereon within the housing 322; and grinding oscillating camshaft 358 has a single cam 366 keyed thereon for rotation in a direction opposite to the cams 362, 364 and at a different rate of rotation.

Each of the three cams operates a roller type follower mechanically linked to a piston reciprocable in a cylinder formed within the top of the housing 322 of the unit, as can be seen. Each follower, piston and cylinder combination forms a liquid pulsator similar to the pulsator sections $a$ through $i$ operated by the cam 238 on the camshaft 236 of the mechanico-hydraulic motivator for the grinding machine without, however, including balancing valves. The three pulsator sections $x$, $y$ and $z$ of the oscillator are similarly connected by liquid columns to suitable valves and thence to the grinding machine.

Grinding pulsator section $x$ operated by cam 366 connects by a liquid column $368x$ (FIG. 19) with the rod end connection 212 of the motor 200 which retracts the wheel carriage 190 on the fixed frame 172 (see FIGURE 19). A suitable fluid pressure responsive three position valve 370 interrupts the liquid column $368x$. The valve in the normal (cross hatched) position determined by pressure from the source RO diverts the liquid column through a line 372 to the low pressure reservoir 324. The valve 370 is adapted to be shifted by a liquid column from pulsator section $h$ of the main motivator unit to establish the connections in the uppermost of the three rectangles. With the valve thus shifted by the pulsator section $h$, the liquid column $368x$ extends directly from the pulsator section $x$ of the oscillator to the rod end of the fluid motor 200 so that the wheel head is now oscillated for grinding by the cam 366. When the cam 238 at pulsator section $h$ of the main motivator unit present a falling face to its follower to allow the valve 370 to again shift back toward the normal position to establish the connections illustrated in the lowermost (cross-hatched) rectangle, a momentary dwell 370' on the cam $h$ allows the valve 370 to establish, for a short time, the connections illustrated in the middle rectangle whereby excess fluid in the column $368x$ is permitted to drain back to the reservoir 324, as can be seen.

Work feed actuator section $y$ operated by cam 364 of the oscillator unit connects by means of a liquid column $368y$ with the ratchet lead screw advancing mechanism 32 which serves to move the work holder and the dressing apparatus radially to and from the grinding wheel. A fluid pressure responsive valve 374 also interrupts liquid column $368y$ and, in the normal RO biased (cross-hatched) position, diverts the liquid column through a line 376 to the low pressure reservoir 324. Valve 374 is adapted to be shifted by means of fluid pressure from a line 378 to a position in which the connections illustrated in the uppermost of the two rectangles are established. In this position, the liquid column $368y$ extends in uninterrupted fashion between the pulsator $y$ and the ratchet feed mechanism 32, whereby every rise on the cam 364 serves to advance the slide 26 in relation to the base 10.

The new wheel dressing oscillator section $z$ operated by cam 362 of the oscillator unit connects by means of a liquid column $368z$ with the rod end of motor 200 for retracting the wheel carriage 190. Liquid column $368z$ is also interrupted by a three-position pressure responsive valve 380 which in the normal (cross-hatched) RO biased position diverts the liquid column through a line 382 to the low pressure reservoir 324. Valve 380 is also connected to be shifted by pressure from the line 378 through a restricted orifice-ball check control 384, for delaying the return motion of the valve. When shifted by the pressure of fluid from the line 378, the connections illustrated in the uppermost of the three rectangles are established, and the liquid column $368z$ directly interconnects the pulsator section z with the rod end of fluid motor 200 to oscillate the wheel carriage 190. When pressure in line 378 is interrupted to allow the valve 380 to return to its closed position, the restricted orifice 384 curtails the draining of the pressure through line 378 and allows the connections illustrated in the middle rectangle of valve 380 to be momentarily established for the purpose of diverting fluid from the motor 200 back to the low pressure reservoir 324 through line 382. The restricted orifice drain 384 serves the same purpose as the momentary dwell 370' on the cam 238 of pulsator section $h$ of the main motivator: each serves to establish briefly the connection shown in the middle rectangle of valves 370, 380 only as they shift from their operative positions back to their normal (cross-hatched) positions.

Pressure in the line 378 for shifting the valves 374 and 380 is generated by a pump 386 which pressurizes fluid from an atmospheric reservoir 388. A two position, solenoid actuated, spring-loaded valve 390 allows pressure communication from the pump 386 to the line 378 when the solenoid actuated connections illustrated in the uppermost rectangle are established, and allows fluid from the line 378 to drain back to the reservoir 388 when the connections illustrated in the spring-urged or lowermost rectangle are established. A light weight ball check valve 392 in the return drain line to the reservoir 388 serves to maintain the lines full of fluid and prevent air pockets from accumulating.

Fluid line 378 also communicates with connection 166 which controls the piston 162 for shifting the limit stop of the dresser arm operating motor to hold the diamond point down in the operative position, as previously explained. Thus, when valve 390 is shifted by the solenoid to establish the connections illustrated in the uppermost rectangle, the diamond arm 142 is held down in the operative position, the valve 374 is shifted so that undulations on the cam 364 of the oscillator unit will serve by means of the ratchet mechanism 32 to advance the slide member 26 in relation to the base 10 towards the grinding wheel, and valve 380 is shifted to a position in which the rise and fall pattern on the cam 362 of the oscillator unit is imparted to the wheel carriage 190 to oscillate the grinding wheel to and fro in relation to the lowered dressing tool 140. When the valve 390 is spring urged to the normal position, the pulsator sections $y$ and $z$ of the oscillator unit merely transfer liquid column motion to and from the low pressure reservoir 324, and the shiftable limit stop 160 of the dresser apparatus is retracted to its normal position, whereby the diamond arm may be moved to and from its operative position solely by the pulsator section $a$ of the main mechanico-hydraulic motivator unit.

The low pressure reservoir 324 for the oscillator unit may comprise a cast container 325 secured by suitable bolts 327 to the top 329 of the housing 322 of the oscillator, and it may have a lid or cover 329' held thereon by fasteners 331. Within a thickened portion of the base of the reservoir unit are three parallel, horizontal bores containing axially shiftable spools which constitute the valves 370, 374 and 380. Suitable porting connects specific axial zones of the valve bores with the interior of the reservoir; similarly, suitable porting in the manifold plate cover 329 of the oscillator unit connects certain axial zones of the valve bores with the pulsator sections $x$, $y$ and $z$; other porting from the biasing source RO to the valve bores, from the main motivator pulsator station $h$ to one end of the bore for the valve 370, and from the line 378 to one end of the bores for the valves 374 and 380 are provided: all such porting serves to establish the connections schematically illustrated in the righthand portion of FIGURE 19.

The valves 370 and 380, aside from connecting and disconnecting the liquid columns 368x and 368z to and from the lefthand end of the wheel carriage motor 200, as explained above, also serve to simultaneously connect and disconnect the pressurized source RO to and from the righthand end of the motor 200. By means of this expedient, both cams at the motivator stations $g$ and $i$ may present uniform dwell contours, or base-circles, to their respective followers after moving the piston 204 against the forward limit stop 216, whereupon additional vibratory or oscillatory motion imparted to the piston by either of the oscillator cams 362 or 366 will be counter-biased by the pressurized source RO and will not divert fluid to the reservoir 312 through the relief valve 310 at station $i$. When the valve 370 is shifted to establish the liquid column 368x between the pulsator $x$ and the motor 200, the valve also completes a line 371 between the source RO (via the free piston mechanism, explained below) and the motor 200 in opposition to the liquid column connection. When the valve 380 is shifted to establish the liquid column 368z between the pulsator $z$ and the motor 200, the valve also completes a line 381 between the source RO (also via the free piston mechanism) and the motor 200 in opposition to the liquid column connection. Thus, while the wheel carriage 190 is shifted rapidly through its long stroke by the preferred double-acting pulsator arrangement from sections $g$ and $i$ and advantageously avoids using the relatively high pressurized return oil system, it is nevertheless shifted at a slower rate through its shorter strokes—such as the cam 366 grind vibration or the cam 362 dress oscillation—by the single pulsator acting in opposition to the constant pressure counter-biasing system in the same manner as the other fluid motors on the disclosed grinding machine.

Means is also provided by this invention for isolating fluid from the source RO and liquid in the motor 200 to prevent air pockets or bubbles from migrating from the common and thus continuously agitated return oil over to the righthand portion of the motor 200 where they would impair the positive functioning of the liquid column 314i. This is accomplished by use of a free piston 351 shiftable through a limited stroke in a chamber which constitutes a portion of the fluid communication line between the motor 200 and the source RO. Referring to FIGURES 17 and 19, the chamber may comprise a cylindrical bore 353 cast in a thickened portion of the wall 325 of the housing for the reservoir 324. A replaceable cylindrical liner or sleeve 355 is adapted to be snugly engaged by U-cup seals 357 on the piston 351 reciprocable within the liner to prevent leakage past the piston. A connection 359 at the upper end of the bore admits liquid from and to the valves 370 and 380 via the lines 371 and 381, respectively; a connection 361 at the lower end of the bore admits pressurized fluid from the source RO. Thus, when either the valve 370 or the valve 380 is shifted to establish the connections indicated in the uppermost of the diagrammatic rectangles, one or the other of the cams 362 or 366 oscillates the piston 204 of the carriage motor 200 away from its forward limit stop 216 as the cams $g$ and $i$ transfer no motion to their respective liquid columns. The piston 204 is oscillated against the return bias from the source RO via the path 361, 351, either 371 or 381 and connection 210; obviously, as the motor piston 204 is moved away from its stop 216, the free piston 351 will be pushed downwardly in its bore. Similarly, as the oscillator cam presents a dip or fall to its follower at either of the stations $x$ or $z$, the free piston 351 will be forced upwardly in its chamber by the biasing source RO and will bias the motor piston 204 back to the left maintaining the oscillator follower in close contact with the falling cam contour. The sealing fit of the free piston 351 in its chamber thus inhibits bubbles from the source RO entering the lines 371, 381, and connection 210 where they would have an undesirable compressible or spongy influence on the effectiveness of the liquid column 314i during its subsequent operation.

Means is also provided by this invention for compensating for leakage in the lines 371 and 381 in the vicinity of the valves 370 and 380 which would substract fluid therefrom with the undesirable result of allowing the free piston 351 to reach the upper physical limit of its stroke before the motor piston is completely returned to its limit stop 216 whereupon the bottom of each dip of the oscillator cams would draw liquid into the left-hand portion of the motor 200 via the replenishing portion 308 of the balancing valve B at pulsator section g. This, of course, would result in the piston 204 being walked progressively farther to the right upon each minor oscillation imparted by the oscillator cam. Such a means may comprise an independent compensating arrangement for adding a small amount of liquid to the line 371 or the line 381 prior to either of the oscillator cams taking over control of the motor piston 204. This addition involves movement of the free piston 351 away from the upper physical limit of its stroke so that subsequent reciprocations will transfer the full biasing force from the source RO to the piston 204.

During the grind cycle oscillation which involves pulsator section x and valve 370, the main camshaft 236 continues rotation. The compensating means here comprises a small rise 363' on the cam 238 at pulsator station i which pulses a small amount of liquid to the righthand end of the motor 200 just after the piston 204 has been eased against the limit stop 216 by the low base circle of the cam at station g, and immediately before the cam at station i presents its high base circle or dwell portion to its follower. Since the piston 204 can move no farther to the left, this small amount of liquid forces the free piston 351 away from the upper physical limit of its stroke against the biasing pressure from the source RO. The cam at station h, of course, shifts the valve 370 to establish the connections indicated in the uppermost rectangle just prior to this; that is, immediately upon the piston 204 reaching its stop 216 which places the grinding wheel 220 within the aperture of a work piece chucked in the holding mechanism 133. Thereafter, the grind cycle oscillatory motion imparted to the wheel carriage by the cam 366 at station x will be completely counter-biased through its full retract stroke by the source RO, the free piston 351 reciprocating in time with the motor piston 204 and preventing air or other contaminants from entering the liquid lines of the double pulsator operated carriage motor 200.

During the dressing of a new wheel cycle oscillation which involves pulsator section z and valve 380, the main camshaft 236 is stopped. The compensating means here comprises a separate motor 363 including a piston 365 reciprocable through a short stroke in a cylinder 367, and including a piston rod 369. The cylinder 367 is axially aligned with the cylinder 355 in which the free piston reciprocates, and the compensator piston 365 has a larger effective upper face area than the face areas of the free piston. The upper portion of the compensator cylinder connects by means of an appropriate fluid line 361' with the source RO. The line 361' is interrupted by a three-way, two position, spring loaded solenoid actuated valve 391 which serves, in the normal spring-biased position, to interrupt communication between the cylinder 367 and the source RO and to connect the cylinder 367 with the atmospheric reservoir 388 by means of a line 393. Another line 395 including a one-way ball check valve arrangement 397 connects the upper portion of the free piston cylinder 355 with the low pressure reservoir 324 of the oscillator unit. Thus, when the valve 391 is shifted electrically, as described below, so that the connections indicated in the unhatched rectangle are established, the differential areas of the pistons 351 and 365 both subjected to the same pressure source RO cause the compensator piston to move downwardly so that its rod 369 pushes the free piston 351 away from the upper limit of its stroke. As the free piston is pushed down, liquid is drawn into the line 381 between the valve 380 and the free piston through the check valve 397 via the line 395 from the low pressure oscillator reservoir 324. Thereafter, the dress new wheel cycle oscillatory motion imparted to the wheel carriage by the cam 362 at station z will be completely counter-biased through its full retract stroke by the source RO, the free piston 351 reciprocating in time with the motor piston 204 and preventing air or other contaminants from entering the liquid lines of the double pulsator operated carriage motor 200.

Suitable electric circuitry, not shown, including a size determining mechanism such as limit switch 400, indicates when the grinding wheel 220 reaches a prohibitively small diameter. When such a condition exists, circuitry responsive in conventional fashion to limit switch 400 stops operation of the main mechanico-hydraulic motivator cam shaft 236 in a manner equivalent to pushing the cycle stop button 304. At this point, a light on the control panel of the grinding machine may be used to indicate that a new grinding wheel is needed. After a new wheel is installed on the spindle 222, the human operator of the machine may depress a suitable manual start button, not shown, for commencing a cycle which dresses the new wheel to a desired size determined by the limit switch 402 and to a desired surface prior to the resumption of high production grinding operations. The button starts the main mechanico-hydraulic motivator in a manner equivalent to depressing the cycle start button 302, makes a circuit through a limit switch 406 (FIGURE 10) which senses when the wheel carriage is in its forward-most position, and starts an electrical timer 399 which shifts and holds the valve 391 associated with the dress cycle free piston compensator motor. The forward position limit switch 406, when actuated, stops the main motivator in a manner equivalent to depressing the cycle stop button 304, and actuates the solenoid for the valve 390 to hold the dressing arm down in the operative position, and to complete the liquid columns for pulsator sections y and z until the limit switch 402 is tripped. Limit switch 402 starts the main motivator in a manner equivalent to depressing the cycle start button 302, breaks the circuit through the limit switch 406, and deactivates the solenoid for the valve 390, thus allowing regular grinding operations to proceed entirely automatically until the wheel again reaches a prohibitively small diameter.

In operation, the machine works through a repeated cycle of coordinated motions actuated by the cams 238 during one complete revolution of the camshaft 236. At the beginning of each cycle, with the transmission 16 in high speed, suitably designed pulsator sections, not shown, actuate loading mechanism on the tooling plate 170 to position a work piece having an internal surface to be ground in the work holding mechanism 133. The cam 238 at pulsator section c will then operate mechanism to clamp the work piece in the grinding position, where it is rotated by the motor 136. As soon as the work is suitably clamped for grinding, the turbine driven internal grinding wheel 220, supported on the carriage 190, is moved quickly forward by the motor 200 to locate the piston 204 against the stop 216 and the wheel within the workpiece. At this time, the fluid motor 42 will begin to pull the parallel link supported carrier 36 through a short arcuate motion (several thousandths of an inch) until the wheel 220 is positioned immediately adjacent the internal surface of the work piece.

At this point, the transmission shifts itself to low or feed speed and the remainder of the arcuate motion of the work carrier slide 36 progresses at a slower, closely controlled rate as the wheel 220 grinds the internal surface of the work piece in the manner desired. As soon as contact is made between the wheel and the average work piece, pulsator section h shifts the valve 370 to the operative position in which the connections illustrated in the uppermost rectangle are established. With the valve 370 in this position, the small rise 363' on the cam at station i pulses a predetermined volume of liquid into the line 371 to move the piston 351 away from the upper limit of its stroke to compensate for any leakage from the line 371. Thereafter, the cam at section *i* presents a high dwell or base circle to its follower whereupon oscillatory motion determined by the cam 366 of the oscillator unit is transferred by the liquid column 368x to the motor 200 in opposition to the biasing pressure from the source RO via lines 361, 371 to impart a desired oscillatory motion to the wheel carriage 190 and the wheel 220 during the grinding operation. During this period, the cams 238 at pulsator sections *g* and *i* present uniform dwell portions to their followers so that the only motion received by the motor 200 is the additional pulsations from the liquid column 368x. Upon completion of the motion of the work carrier 36 towards the grinding wheel 220, the length of which is determined by the stroke of piston 90 in motor 42 against the limit stop 102, a period of "spark out" is allowed in which the stressed members of the machine are relaxed to lighten the pressure of the high speed grinding wheel against the surface of the workpiece and obtain a highly finished, unburned surface.

Upon completion of the grinding portion of the cycle, the link supported carrier 36 is quickly returned along its arcuate path to its rest position determined by the limit stop 110 for the piston 90. With the work thus removed from contact with the grinding wheel, the cam 238 at pulsator section *h* allows the valve 370 to shift to its normal position, with a momentary dwell at a position in which the excess liquid in column 368x is drained back through line 372 to the low pressure reservoir 324 of the oscillator unit, and the generally complementary cams at sections *g* and *i* no longer present dwell portions to their followers but turn past their base circle portions and present rising and falling faces respectively by which the motor 200 starts to retract the grinding wheel from the vicinity of the work piece. Whereupon, the pulsator section *a* moves the piston 152 to lower the diamond arm 142 to the operative position in which the diamond point 140 is in the path of the periphery of the grinding wheel. Then pulsator section *f* actuates the ratchet mechanism 32 which causes the lead screw mechanism 34 to pull the lower or dresser slide member 26 laterally on the machine through the very small distance that is desired to be dressed off the grinding wheel. As the wheel carriage 190 continues its retracting movement under control of the pulsator sections *g* and *i* the wheel is traversed across the newly located diamond point 140 to satisfactorily dress the wheel for the next grinding operation. The piston 152 associated with pulsator section *a* pivots the diamond arm 142 upwardly to the inoperative position immediately after the wheel is past and the transmission 16 then shifts itself again to the rapid speed. Mechanism in the work piece holder 133 actuated by pulsator section *c* may ungrip the work piece and ejecting mechanism operated by section *e* may push the work piece out of the collet where it is picked up by unloading mechanism on the tooling plate 170 to remove the finished work piece from the vicinity of the grinding machine, and thus complete a normal cycle.

To maintain the accuracy of the diamond sizing dressing operation as the diamond point 140 gradually wears down through continual use, the handle 120 on the compensator mechanism 108 may be turned slightly to advance the limit stop 110. This determines the rest position, which is also the dressing position, of the link supported feed carrier 36. As the displacement of pistons 90 and 92 is thus shortened, surplus oil will of course be needed to keep cylinder 96 and liquid column 314d full as cam 238 of section *d* recedes to its base circle in order that the original timing of the feed stroke be maintained. This oil is obtained from a quantity maintained in the variable volume compensator cylinder 116, and supplied to the liquid column line 314d at the appropriate time through the connection 124 by movement of the expelling piston 122 under timed control of pulsator section *b*, which presents its base circle during the start of the feed stroke so the piston 122 will shift prior to the motor piston.

After many work pieces have been ground by continual rotation of the main camshaft 236, the grinding wheel 220 will be reduced to a size where further grinding operations are prohibited. At this point electrical circuitry responsive to limit switch 400 stops the main motivator camshaft and allows the machine operator to install a new wheel, and reset the laterally traveling carrier 26 with the crank 46 until limit switch 404 is engaged and lights a warning light. With a new wheel installed and the dresser slide 26 back on the side of the base 10 away from the ratchet unit 32, the operator pushes a button (which may be labeled "dress new wheel") which starts the camshaft 236, the timer 399, and closes the limit switch 406 circuit. As shaft 236 is rotated, the cams of sections *g* and *i* move the carriage 190 forward until the limit switch 406 is tripped. This stops the camshaft and operates the solenoid for the valve 390 to shift the pressure responsive valves 374 and 380, and also to lower and hold the diamond arm 142 in its operative position. With the valves 374 and 380 shifted, the free piston moved away from the upper limit of its stroke to compensate for any leakage from the line 381 by previous operation of the timer controlled valve 391, the cams 362 and 364 operate pulsator sections *y* and *z* to advance incrementally the carrier 26 which moves the diamond point 140 radially toward the wheel, and to impart a desired dressing oscillatory motion to the wheel carriage 190. The timer 399 drops out as the oscillatory motions begin and allows the valve 391 to return to its spring-urged position to thus render the large area compensator piston 365 ineffectual. Repeated revolutions of camshaft 356 will repeatedly oscillate the wheel away from its forward position and adjacent the dressing apparatus and also advance the dressing apparatus step by step toward the wheel until the wheel has reached a proper size to resume grinding operations, as indicated by limit switch 402 wihch may interrupt current to the solenoid of the valve 390, drop out the limit switch 406 circuit, and also operate the cycle start button 302 when the wheel attains a satisfactory starting diameter. This operates relay 300 and actuates solenoid 286 whereby the main camshaft 236 of the mechanico-hydraulic motivator once again commences the cyclical grinding of work pieces throughout the useful life of the newly installed grinding wheel, that is, until repeated advances of slides 26 under control of the feeder 32 actuates the limit switch 400 once again.

Thus, a fully automatic wheel oscillator is provided which moves a tool and a work piece relative to one another with various length strokes and at various rates of speed. Combined with an internal grinding machine, the high speed grinding wheel, after radially approaching the internal surface of the work piece quite rapidly until contact is almost made and then moving more slowly at a precisely controlled rate to produce the desired action of the wheel on the work, is oscillated axially to and fro at a given rate. A pair of opposed pulsator units including combined relief and replenishing balancing valves serve to shift the wheel carriage to and fro with one motion and without return oil. A second pulsator unit with a valve controlled liquid column is arranged to oscillate the wheel carriage against return oil with the slower and shorter motion desired for grinding operations. Finally, a third pulsator unit with a valve controlled liquid column is adapted to oscillate the wheel carriage against return oil in the manner desired for dressing the surface of a newly installed wheel. The free piston keeps return oil fluid out of the double cam pulsator system, while the two compensator arrangements insure that the free piston does not detract from the full-stroke counter-biasing effect of the return oil system when it is employed in conjunction with the oscillator cams. Suitable electric and pressure controlled valves render the entire operation fully automatic. Because of the possibility of using flexible conduit to confine the liquid columns, the oscillator unit of this invention may be located remotely from the machine, and thus is readily adaptable to any type of machine tool, and is not limited to shiftable carriages of grinding machines.

While the above described embodiment constitutes a preferred mode of carrying out this invention, many other forms might be adopted within the scope of the invention, which is variously claimed as:

1. In a machine tool having a shiftable carriage, a double acting expansible chamber type piston and cylinder motor connected to operate the carriage, a pair of single acting expansible chamber type transmitters and a pair of motion transferring liquid columns connecting each transmitter in opposition to the carriage motor, a pair of generally complementary rotary cams driven in unison and connected to cooperatively actuate the transmitters to shift the carriage to-and-fro with a predetermined frequency, a third expansible chamber type transmitter and a third motion transferring liquid column connected with the carriage motor, a third rotary cam connected to actuate the third transmitter to shift the carriage with a separate motion additional to the shifting with a predetermined frequency, and control means connected to selectively render the third rotary cam effective to shift the carriage with the separate motion at a predetermined point in the rotation of the pair of rotary cams.

2. In a machine tool having a shiftable carriage, a double acting expansible chamber type piston and cylinder motor connected to operate the carriage, a pair of single-acting expansible chamber type transmitters and a pair of motion transferring liquid columns connecting each transmitter in opposition to the carriage motor, a pair of generally complementary rotary cams driven in unison and connected to cooperatively actuate the transmitters to shift the carriage to-and-fro with an intermittent motion, the cams having corresponding base circle portions during which no motion is transmitted to the motor by the liquid columns, a third expansible chamber type transmitter and a third motion transferring liquid column connected with the carriage motor, a third rotary cam connected to actuate the third transmitter to shift the carriage to-and-fro with a vibratory motion when the pair of cams present their base circles to the pair of transmitters, and control means for rendering the third rotary cam ineffective to shift the carriage when the pair of cams are imparting motion to the carriage.

3. In a machine tool having a shiftable carriage, a double acting expansible chamber type piston and cylinder motor connected to operate the carriage, a pair of single-acting expansible chamber type transmitters and a pair of motion transferring liquid columns connecting each transmitter in opposition to the carriage motor, a pair of generally complementary rotary cams driven in unison and connected to cooperatively actuate the transmitters to shift the carriage to-and-fro with an intermittent motion, the cams having corresponding base circle portions during which no motion is transmitted to the motor by the liquid columns, a third expansible chamber type transmitter and a third motion transferring liquid column connectable with the carriage motor, a source of fluid pressure connectable with the carriage motor in opposition to the third liquid column, a third rotary cam connected to actuate the third transmitter to shift the carriage to-and-fro against the source with a vibratory motion, and control means for connecting both the third liquid column and the source of fluid pressure with the carriage motor when the pair of cams present their base circles to the pair of transmitters.

4. In a machine tool having a shiftable carriage, a double acting expansible chamber type piston and cylinder motor connected to operate the carriage, a pair of single-acting expansible chamber type transmitters and a pair of motion transferring liquid columns connecting each transmitter in opposition to the carriage motor, a pair of generally complementary rotary cams driven in unison and connected to cooperatively actuate the transmitters to shift the carriage to-and-fro with an intermittent motion, the cams having corresponding base circle portions during which no motion is transmitted to the motor by the liquid columns, a third expansible chamber type transmitter and a third motion transferring liquid column connectable with the carriage motor, a source of fluid pressure connectable with the carriage motor in opposition to the third liquid column, a third rotary cam connected to actuate the third transmitter to shift the carriage to-and-fro against the source with a vibratory motion, and conrol means including means responsive to the rotation of the pair of cams operable to connect the third liquid column and the source of fluid pressure with the carriage motor whereby the carriage may be shifted with the vibratory motion while the pair of cams continue rotation.

5. In a machine tool having a shiftable carriage, a double acting expansible chamber type piston and cylinder motor connected to operate the carriage, a pair of single-acting expansible chamber type transmitters and a pair of motion transferring liquid columns connecting each transmitter in opposition to the carriage motor, a pair of generally complementary rotary cams driven in unison and connected to cooperatively actuate the transmitters to shift the carriage to-and-fro with an intermittent motion, the cams having corresponding base circle portions during which no motion is transmitted to the motor by the liquid columns, a third expansible chamber type transmitter and a third motion transferring liquid column connectable with the carriage motor, a source of fluid pressure connectable with the carriage motor in opposition to the third liquid column, a third rotary cam connected to actuate the third transmitter to shift the carriage to-and-fro against the source with a vibratory motion, and control means including means operable independently of rotation of the pair of cams to connect the third liquid column and the source of fluid pressure with the carriage motor whereby the carriage may be shifted with the vibratory motion while the pair of cams is not rotating.

6. In a machine tool having a shiftable carriage, a double acting expansible chamber type piston and cylinder motor connected to operate the carriage, a pair of single acting expansible chamber type transmitters and a pair of motion transferring liquid columns connecting each transmitter in opposition to the carriage motor, a pair of generally complementary rotary cams driven in unison and connected to cooperatively actuate the transmitters to shift the carriage to-and-fro with an intermittent motion, the cams having corresponding base circle portions during which no motion is transmitted to the motor by the liquid columns, a third expansible chamber type transmitter and a third motion transferring liquid column connectable with the carriage motor, a source of counterbiasing fluid pressure, a pressure communication line connectable between the source and the carriage motor in opposition to the third liquid column, a piston freely shiftable in the line through a limited stroke and inhibiting interchange of fluid between the source and the motor, a third rotary cam connected to actuate the third transmitter to shift the carriage to-and-fro against the source wih a vibratory motion, and control means for connecting both the line from the fluid pressure source and the third liquid column with the carriage motor when the pair of cams present their base circles to the pair of transmitters.

7. In a machine tool having a shiftable carriage, a double acting expansible chamber type piston and cylinder motor connected to operate the carriage, a pair of single acting expansible chamber type transmitters and a pair of motion transferring liquid columns connecting each transmitter in opposition to the carriage motor, a pair of generally complementary rotary cams driven in unison and connected to cooperatively actuate the transmitters to shift the carriage to-and-fro with an intermittent motion, the cams having corresponding base circle portions during which no motion is transmitted to the motor by the liquid columns, a third expansible chamber type transmitter and a third motion transferring liquid column connectable with the carriage motor, a source of counter-biasing fluid pressure, a pressure communication line connectable between the source and the carriage motor in opposition to the third liquid column, a piston freely shiftable in the line through a limited stroke and inhibiting interchange of fluid between the source and the motor, a third rotary cam connected to actuate the third transmitter to shift the carriage to-and-fro against the source with a vibratory motion, control means for connecting both the line from the source of fluid pressure and the third liquid column with the carriage motor when the pair of cams present their base circles to the pair of transmitters, and compensating means operable to add a small amount to the volume in the line between the motor piston and the free piston to compensate for any volume loss in the line between the free piston and the motor piston whereby subsequent operation of the third transmitter is fully counter-biased by the source without the free piston reaching the limit of its stroke.

8. In a machine tool having a shiftable carriage, a double acting expansible chamber type piston and cylinder motor connected to operate the carriage, a pair of single acting expansible chamber type transmitters and a pair of motion transferring liquid columns connecting each transmitter in opposition to the carriage motor, a pair of generally complementary rotary cams driven in unison and connected to cooperatively actuate the transmitters to shift the carriage to-and-fro with an intermittent motion, the cams having corresponding base circle portions during which no motion is transmitted to the motor by the liquid columns, a third expansible chamber type transmitter and a third motion transferring liquid column connectable with the carriage motor, a source of counter-biasing fluid pressure, a pressure communication line connectable between the source and the carriage motor in opposition to the third liquid column, a piston freely shiftable in the line through a limited stroke and inhibiting interchange of fluid between the source and the motor, a third rotary cam connected to actuate the third transmitter to shift the carriage to-and-fro against the source with a vibratory motion, control means for connecting both the line from the source of fluid pressure and the third liquid column with the carriage motor when the pair of cams present their base circles to the pair of transmitters, and compensating means comprising a ramp change on one cam of the pair of cams to shift the free piston away from one limit of its stroke against the source of fluid pressure and operable to add a small amount to the volume in the line between the motor piston and the free piston to compensate for any volume loss in the line between the free piston and the motor piston whereby subsequent operation of the third transmitter is fully counter-biased by the source without the free piston reaching the limit of its stroke.

9. In a machine tool having a shiftable carriage, a double acting expansible chamber type piston and cylinder motor connected to operate the carriage, a pair of single acting expansible chamber type transmitters and a pair of motion transferring liquid columns connecting each transmitter in opposition to the carriage motor, a pair of generally complementary rotary cams driven in unison and connected to cooperatively actuate the transmitters to shift the carriage to-and-fro with an intermittent motion, the cams having corresponding base circle portions during which no motion is transmitted to the motor by the liquid columns, a third expansible chamber type transmitter and a third motion transferring liquid column connectable with the carriage motor, a source of counter-biasing fluid pressure, a pressure communication line connectable between the source and the carriage motor in opposition to the third liquid column, a piston freely shiftable in the line through a limited stroke and inhibiting interchange of fluid between the source and the mo-tor, a third rotary cam connected to actuate the third transmitter to shift the carriage to-and-fro against the source with a vibratory motion, control means for connecting both the line from the source of fluid pressure and the third liquid column with the carriage motor when the pair of cams present their base circles to the pair of transmitters, and compensating means comprising individual motor means connected to shift the free piston away from one limit of its stroke against the source of fluid pressure and operable to add a small amount to the volume in the line between the motor piston and the free piston to compensate for any volume loss in the line between the free piston and the motor piston whereby subsequent operation of the third transmitter is fully counter-biased by the source without the free piston reaching the limit of its stroke.

10. In a machine tool having a shiftable carriage, a double acting expansible chamber type piston and cylinder motor connected to operate the carriage, a pair of single acting expansible chamber type transmitters and a pair of motion transferring liquid columns connecting each transmitter in opposition to the carriage motor, a pair of generally complementary rotary cams driven in unison and connected to cooperatively actuate the transmitters to shift the carriage to-and-fro with a predetermined frequency, third and fourth expansible chamber type transmitters and third and fourth motion transferring liquid columns individually connectable with the carriage motor, third and fourth rotary cams connected to actuate the third and fourth transmitters respectively to shift the carriage with one or the other of two different vibratory motions additional to the shifting with a predetermined frequency, and control means for selectively connecting the third liquid column with the carriage motor while the pair of cams continue rotation to produce one vibratory motion and for selectively connecting the fourth liquid column with the carriage motor while the pair of cams is not rotating to produce the other vibratory motion.

11. In a machine tool having a shiftable carriage, a double acting expansible chamber type piston and cylinder motor connected to operate the carriage, a single acting expansible chamber type transmitter and a motion transferring liquid column connecting the transmitter to the carriage motor, a rotary cam connected to actuate the transmitter to shift the carriage to-and-fro, a source of counter-biasing fluid pressure, a pressure communication line connected between the source and the carriage motor in opposition to the liquid column, and a piston freely shiftable in the line through a limited stroke and inhibiting interchange of fluid between the source and the motor whereby the free piston will shift to-and-fro as the transmitter operates the carriage motor against the source of fluid pressure.

12. In a machine tool having a shiftable carriage, a double acting expansible chamber type piston and cylinder motor connected to operate the carriage, a single acting expansible chamber type transmitter and a motion transferring liquid column connecting the transmitter to the carriage motor, a rotary cam connected to actuate the transmitter to shift the carriage to-and-fro, a source of counterbiasing fluid pressure, a pressure communication line connected between the source and the carriage motor in opposition to the liquid column, and a piston freely shiftable in the line through a limited stroke and inhibiting interchange of fluid between the source and the motor, and compensating means periodically operable to add a small amount to the volume in the line between the motor piston and the free piston to compensate for any volume loss in the line between the free piston and the motor piston whereby the free piston will shift to-and-fro without reaching the limit of its stroke as the transmitter operates the carriage motor against the continuous counter-biasing of the source of fluid pressure.

13. In a machine tool having a shiftable carriage, a double acting expansible chamber type piston and cylinder motor connected to operate the carriage, a single acting expansible chamber type transmitter and a motion transferring liquid column connecting the transmitter to the carriage motor, a rotary cam connected to actuate the transmitter to shift the carriage to-and-fro, a source of counter-biasing fluid pressure, a pressure communication line connected between the source and the carriage motor in opposition to the liquid column, and a piston freely shiftable in the line through a limited stroke and inhibiting interchange of fluid between the source and the motor, and compensating means periodically operable to add a small amount to the volume in the line between the motor piston and the free piston to compensate for any volume loss in the line between the free piston and the motor piston, the compensating means comprising a separate supply of fluid pressure and means connected to pressurize a small volumetric amount from the separate supply to the line to shift the free piston away from one limit of its stroke against the source of fluid pressure whereby the free piston will shift to-and-fro without reaching the limit of its stroke as the transmitter operates the carriage motor against the continuous counter-biasing of the source of fluid pressure.

14. In a machine tool having a shiftable carriage, a double acting expansible chamber type piston and cylinder motor connected to operate the carriage, a single acting expansible chamber type transmitter and a motion transferring liquid column connecting the transmitter to the carriage motor, a rotary cam connected to actuate the transmitter to shift the carriage to-and-fro, a source of counter-biasing fluid pressure, a pressure communication line connected between the source and the carriage motor in opposition to the liquid column, and a piston freely shiftable in the line through a limited stroke and inhibiting interchange of fluid between the source and the motor, and compensating means periodically operable to add a small amount to the volume in the line between the motor piston and the free piston to compensate for any volume loss in the line between the free piston and the motor piston, the compensating means comprising motor means connected to shift the free piston away from one limit of its stroke against the source of fluid pressure, a separate supply of fluid pressure, and check valve means connecting the supply with the line whereby the small volumetric amount is transferred from the supply to the line as the free piston is shifted by the motor means whereby the free piston will shift to-and-fro without reaching the limit of its stroke as the transmitter operates the carriage motor against the continuous counter-biasing of the source of fluid pressure.

15. In a machine tool, a first and a second double acting expansible chamber type piston and cylinder motor, conduit means connecting the first motor cylinder with the second motor cylinder for free interchange of fluid, a single acting expansible chamber type transmitter and a motion transferring liquid column connecting the transmitter to the first motor cylinder in opposition to the conduit means, a source of counter-biasing fluid pressure connected to the second motor cylinder in opposition to the conduit means, and a rotary cam connected to actuate the transmitter to shift both the first and second motor pistons to-and-fro generally simultaneously against the source of fluid pressure.

16. In a machine tool, a first and a second double acting expansible chamber type piston and cylinder motor, conduit means connecting the first motor cylinder with the second motor cylinder for free interchange of fluid, a single acting expansible chamber type transmitter and a motion transferring liquid column connecting the transmitter to the first motor cylinder in opposition to the conduit means, a source of counter-biasing fluid pressure connected to the second motor cylinder in opposition to the conduit means, and a rotary cam connected to actuate the transmitter to shift both the first and second motor pistons to-and-fro generally simultaneously against the source of fluid pressure, and compensating means connected to balance the volume in the conduit between the motor pistons to compensate for any volume loss therein whereby both pistons will complete a desired stroke during continued operation of the cam actuated transmitter.

17. In a machine tool in combination, a carriage, means for operating the carriage to-and-fro with one predetermined motion pattern including a rotary cam which drives an expansible chamber transmitter connected by a liquid column to an expansible chamber motor which moves the carriage to-and-fro, means for operating the carriage with a second motion pattern independent of the first motion pattern including a second rotary cam which actuates a second expansible chamber transmitter connected by a second liquid column to said motor, and control means connected to render the second cam effective to impart said second motion pattern to the carriage at a predetermined point in the rotation of the first cam.

18. In a machine tool in combination, a carriage, means for operating the carriage to-and-fro with one predetermined motion pattern including rotary cam means which drives an expansible chamber transmitter connected by a liquid column to an expansible chamber motor which moves the carriage to-and-fro, and means for operating the carriage with a second motion pattern independent of the first motion pattern including second rotary means responsive to the position of said first cam means which actuates an expansible chamber transmitter connected by a liquid column to said motor.

19. In a machine tool in combination, a carriage, means for operating the carriage to-and-fro with one predetermined motion pattern including a rotary cam which drives an expansible chamber transmitter connected by a liquid column to an expansible chamber motor which moves the carriage to-and-fro, said cam having a dwell contour which transmits no motion to the transmitter, means for operating the carriage with a second motion pattern independent of the first motion pattern including a second rotary cam which actuates a second expansible chamber transmitter connected by a second liquid column to said motor, and control means for rendering the second cam ineffective to move the carriage when the first cam is moving the carriage.

20. In a machine tool in combination, a carriage, means for operating the carriage to-and-fro with one predetermined motion pattern including a rotary cam which drives an expansible chamber transmitter connected by a liquid column to an expansible chamber which moves the carriage to-and-fro, said cam having a base circle which transmits no motion to the transmitter, means for operating the carriage with a second motion pattern independent of the first motion pattern including a second rotary cam which actuates a second expansible chamber transmitter connected by a second liquid column to said motor, and control means for rendering the second cam effective to impart said second motion to the carriage when the first cam presents its base circle to its transmitter and for rendering the second cam ineffective to move the carriage when the first cam is moving the carriage.

21. In a machine tool in combination, a carriage, means for operating the carriage with one predetermined motion pattern including a rotary cam which drives an expansible chamber transmitter connected by a liquid column to an expansible chamber motor which moves the carriage to-and-fro, said cam having a dwell contour which transmits no motion to the transmitter, means for operating the carriage with a second motion pattern independent of the first motion pattern including a second rotary cam which actuates a second expansible chamber transmitter connectible by a second liquid column to said motor, a source of pressure fluid connectible with the motor in opposition to the second liquid column, and control means for connecting both the second liquid column and said source to the motor when the first cam presents its dwell contour to its transmitter.

22. In a machine tool in combination, a carriage, means for operating the carriage to-and-fro with one predetermined motion pattern including a rotary cam which drives an expansible chamber transmitter connected by a liquid column to an expansible chamber motor which moves the carriage to-and-fro, said cam having a dwell contour which imparts no motion to the transmitter, a second expansible chamber transmitter connected to a second liquid column which is connectible to said motor, a second rotary cam for actuating the second transmitter to actuate the carriage in a second motion pattern independent of the first motion pattern, a source of fluid pressure connectible with the motor in opposition to the second liquid column, and control means responsive to rotation of the first cam for connecting the source and the second liquid column with the motor to actuate the carriage in the second motion pattern during rotation of the first cam.

23. In a machine tool in combination, a carriage, means for operating the carriage to-and-fro with one predetermined motion pattern including a rotary cam which drives an expansible chamber transmitter connected by a liquid column to an expansible chamber motor which moves the carriage to-and-fro, said cam having a dwell contour which imparts no motion to the transmitter, a second expansible chamber transmitter connected to a second liquid column which is connectible to said motor, a second rotary cam for actuating the second transmitter to actuate the carriage in a second motion pattern independent of the first motion pattern, a source of fluid pressure connectible with the motor in opposition to the second liquid column, and control means operable independently of rotation of the first cam for connecting the source and the second liquid column with the motor to actuate the carriage in the second motion pattern while the first cam is not rotating.

24. In a machine tool in combination, a carriage, means for operating the carriage to-and-fro with one predetermined motion pattern including a rotary cam which drives an expansible chamber transmitter connected by a liquid column to an expansible chamber motor which moves the carriage to-and-fro, said cam having a dwell contour which imparts no motion to the transmitter, a second expansible chamber transmitter connected to a second liquid column which is connectible to said motor, a second rotary cam for actuating the second transmitter to actuate the carriage in a second motion pattern independent of the first motion pattern, a source of fluid pressure, a conduit for transmitting the pressure of the source to the motor in opposition to the second liquid column, a piston freely shiftable in the conduit through a limited stroke and preventing flow of fluid from the source to the motor, and control means for connecting both the conduit and the second liquid column with the motor when the first cam presents its dwell contour to its transmitter.

25. Apparatus as defined in claim 24 further characterized by compensating means operable to add a small amount to the volume in the conduit between the motor and the free piston to compensate for any volume loss in the conduit between the free piston and the motor whereby subsequent operation of the second transmitter is fully counter-biased by the source without the free piston reaching the limit of its stroke.

26. Apparatus as defined in claim 24 further characterized by compensating means comprising individual motor means connected to shift the free piston away from one limit of its stroke against the source of fluid pressure and operable to add a small amount to the volume in the conduit between the motor and the free piston to compensate for any volume loss in the conduit between the free piston and the motor whereby subsequent operation of the second transmitter is fully counter-biased by the source without the free piston reaching the limit of its stroke.

27. In a machine tool in combination, a carriage, means for operating the carriage to-and-fro with one predetermined motion pattern including a rotary cam which drives an expansible chamber transmitter connected by a liquid column to an expansible chamber motor having a piston and which moves the carriage to-and-fro, said cam having a dwell contour which imparts no motion to the transmitter, a second expansible chamber transmitter connected to a second liquid column which is connectible to said motor, a second rotary cam for actuating the second transmitter to actuate the carriage in a second motion pattern independent of the first motion pattern, a source of fluid pressure, a conduit for connecting the source and the motor in opposition to the second liquid column, a piston freely shiftable in the conduit through a limited stroke to prevent flow of fluid from one end of the conduit to its other end, control means for connecting both the conduit and the second liquid column with the motor when the first cam presents its dwell contour to its transmitter, and compensating means comprising a ramp on the first cam for shifting the free piston away from one limit of its stroke against the source of fluid pressure and operable to add a small amount to the volume in the conduit between the motor piston and the free piston to compensate for any volume loss in the conduit between the free piston and the motor piston whereby subsequent operation of the second transmitter is fully counter-biased by the source without the free piston reaching the limit of its stroke.

28. In a machine tool in combination, a carriage, means for operating the carriage to-and-fro with one predetermined motion pattern including a rotary cam which drives an expansible chamber transmitter connected by a liquid column to an expansible chamber motor which moves the carriage to-and-fro, second and third expansible chamber type transmitters and second and third motion transferring liquid columns individually connectable with the motor, second and third rotary cams connected to actuate the second and third transmitters respectively to shift the carriage with one or the other of two different motion patterns additional to the first motion pattern, and control means for selectively connecting the second liquid column with the motor while the first cam continues rotation to produce the first additional pattern motion and for selectively connecting the third liquid column with the motor while the first cam is not rotating to produce the second additional motion pattern.

References Cited by the Examiner

UNITED STATES PATENTS

| | | |
|---|---|---|
| 2,092,895 | 9/1937 | Stevens. |
| 2,625,912 | 1/1953 | May. |
| 2,735,420 | 2/1956 | Dall. |
| 2,774,192 | 12/1956 | Grobey _____ 51—165 X |
| 2,915,855 | 12/1959 | Thompson. |
| 3,146,596 | 9/1964 | Thompson _____ 60—54.5 |

LESTER M. SWINGLE, *Primary Examiner.*